United States Patent
Alameh et al.

(10) Patent No.: US 11,216,233 B2
(45) Date of Patent: Jan. 4, 2022

(54) METHODS AND SYSTEMS FOR REPLICATING CONTENT AND GRAPHICAL USER INTERFACES ON EXTERNAL ELECTRONIC DEVICES

(71) Applicant: Motorola Mobility LLC, Chicago, IL (US)

(72) Inventors: Rachid Alameh, Crystal Lake, IL (US); Jarrett Simerson, Glenview, IL (US); John Gorsica, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 70 days.

(21) Appl. No.: 16/533,627

(22) Filed: Aug. 6, 2019

(65) Prior Publication Data

US 2021/0042078 A1 Feb. 11, 2021

(51) Int. Cl.
*G06F 3/14* (2006.01)
*G06F 3/16* (2006.01)

(52) U.S. Cl.
CPC ............ *G06F 3/1423* (2013.01); *G06F 3/167* (2013.01)

(58) Field of Classification Search
CPC ............................... G06F 3/1423; G06F 3/167
See application file for complete search history.

(56) References Cited

U.S. PATENT DOCUMENTS 9,075,435 B1 * 7/2015 Noble ............... H04M 1/72454
9,521,238 B1 * 12/2016 Thanayankizil ..... H04B 1/3822
10,687,018 B1 * 6/2020 Jeong ................ H04N 21/4363
2007/0204228 A1 * 8/2007 Minear ................ H04M 3/493
715/728
2009/0075697 A1 * 3/2009 Wilson ...................... G06F 3/01
455/557
2012/0244876 A1 * 9/2012 Park .................... H04M 1/6091
455/456.1
2012/0249741 A1 * 10/2012 Maciocci .............. G06T 15/503
348/46
2013/0324035 A1 * 12/2013 Strommen ............ G06F 1/1632
455/41.1

(Continued)

OTHER PUBLICATIONS

Create a Bluetooth Scanner With Androids Bluetooth API by Matthew Kim available on Jul. 13, 2015 at https://code.tutsplus.com/ (Year: 2015).*

(Continued)

*Primary Examiner* — William L Bashore
*Assistant Examiner* — Nathan K Shrewsbury
(74) *Attorney, Agent, or Firm* — Philip H. Burrus, IV

(57) ABSTRACT

An electronic device includes a physical user interface, a wireless communication device, and one or more processors. The one or more processors identify one or more external electronic devices operating within an environment of the electronic device. The one or more processors cause the wireless communication device to transmit content and one or more control commands causing an external electronic device to present a graphical user interface depicting the physical user interface of the electronic device. The wireless communication device then receives one or more other control commands identifying user inputs interacting with the graphical user interface at the external electronic device. The one or more processors perform one or more control operations in response to the one or more other control commands.

20 Claims, 10 Drawing Sheets

(56) References Cited

U.S. PATENT DOCUMENTS

| | | | | |
|---|---|---|---|---|
| 2014/0358990 A1* | 12/2014 | Huang | ............... | H04W 4/60 709/203 |
| 2014/0359493 A1* | 12/2014 | Hong | ............... | G06F 3/1454 715/761 |
| 2014/0361954 A1* | 12/2014 | Epstein | ............... | H04M 7/0027 345/2.3 |
| 2015/0178034 A1* | 6/2015 | Penilla | ............... | G06Q 30/0226 345/1.1 |
| 2015/0277559 A1* | 10/2015 | Vescovi | ............... | G06F 1/163 345/173 |
| 2016/0134737 A1* | 5/2016 | Pulletikurty | ............... | G06F 3/0485 715/735 |
| 2017/0108918 A1* | 4/2017 | Boesen | ............... | G06F 1/163 |
| 2017/0161720 A1* | 6/2017 | Xing | ............... | A61B 5/4848 |
| 2017/0192401 A1* | 7/2017 | Wexler | ............... | G06K 9/00671 |
| 2017/0277498 A1* | 9/2017 | Wood, Jr. | ............... | G06F 3/033 |
| 2017/0286047 A1* | 10/2017 | Patil | ............... | G06F 3/0346 |
| 2017/0332128 A1* | 11/2017 | Jeong | ............... | H04N 21/42204 |
| 2017/0337900 A1* | 11/2017 | Dai | ............... | G09G 5/005 |
| 2018/0095617 A1* | 4/2018 | Valdivia | ............... | G06F 3/013 |
| 2018/0095628 A1* | 4/2018 | Choi | ............... | G09G 5/14 |
| 2018/0120892 A1* | 5/2018 | von Badinski | ............... | G08B 21/02 |
| 2018/0299996 A1* | 10/2018 | Kugler | ............... | G06F 3/017 |
| 2018/0336011 A1* | 11/2018 | Kim | ............... | H04L 51/046 |
| 2019/0073180 A1* | 3/2019 | Nunan | ............... | H04L 67/1095 |
| 2019/0121522 A1* | 4/2019 | Davis | ............... | G06F 3/04815 |
| 2020/0066273 A1* | 2/2020 | Tanabe | ............... | G06F 3/167 |
| 2020/0076631 A1* | 3/2020 | Yoon | ............... | H04L 12/12 |
| 2020/0192622 A1* | 6/2020 | Stoyles | ............... | G06K 9/00335 |

OTHER PUBLICATIONS

Thomas, Dallas , "Mirror & Control Your Android's Screen on Your Windows PC", Gadget Hacks; Published Dec. 12, 2016 online at https://android.gadgethacks.com/how-to/mirror-control-your-androids-screen-your-windows-pc-0175404/.

* cited by examiner

METHODS AND SYSTEMS FOR REPLICATING CONTENT AND GRAPHICAL USER INTERFACES ON EXTERNAL ELECTRONIC DEVICES

BACKGROUND

Technical Field

This disclosure relates generally to electronic devices, and more particularly to electronic devices having wireless communication capabilities.

Background Art

Portable electronic devices are becoming smaller and smaller. A mobile phone configured only to make voice calls was the size of a shoebox not too long ago. Now, smartphones that can surf the web, maintain calendars, capture pictures and videos, send and receive text and multimedia messages, determine geographic location, and monitor health, in addition to making voice calls, slip easily into a pants pocket.

This evolution towards smallness is not entirely free of complication, however. As electronic devices get smaller, their user interfaces can be difficult to see. Text can become difficult to read due to small displays. Sounds can be difficult to hear due to small acoustic transducers, and so forth. It would be advantageous to have improved methods and systems that allow for small user interfaces without sacrificing a user's ability to consume content.

Figure 1:
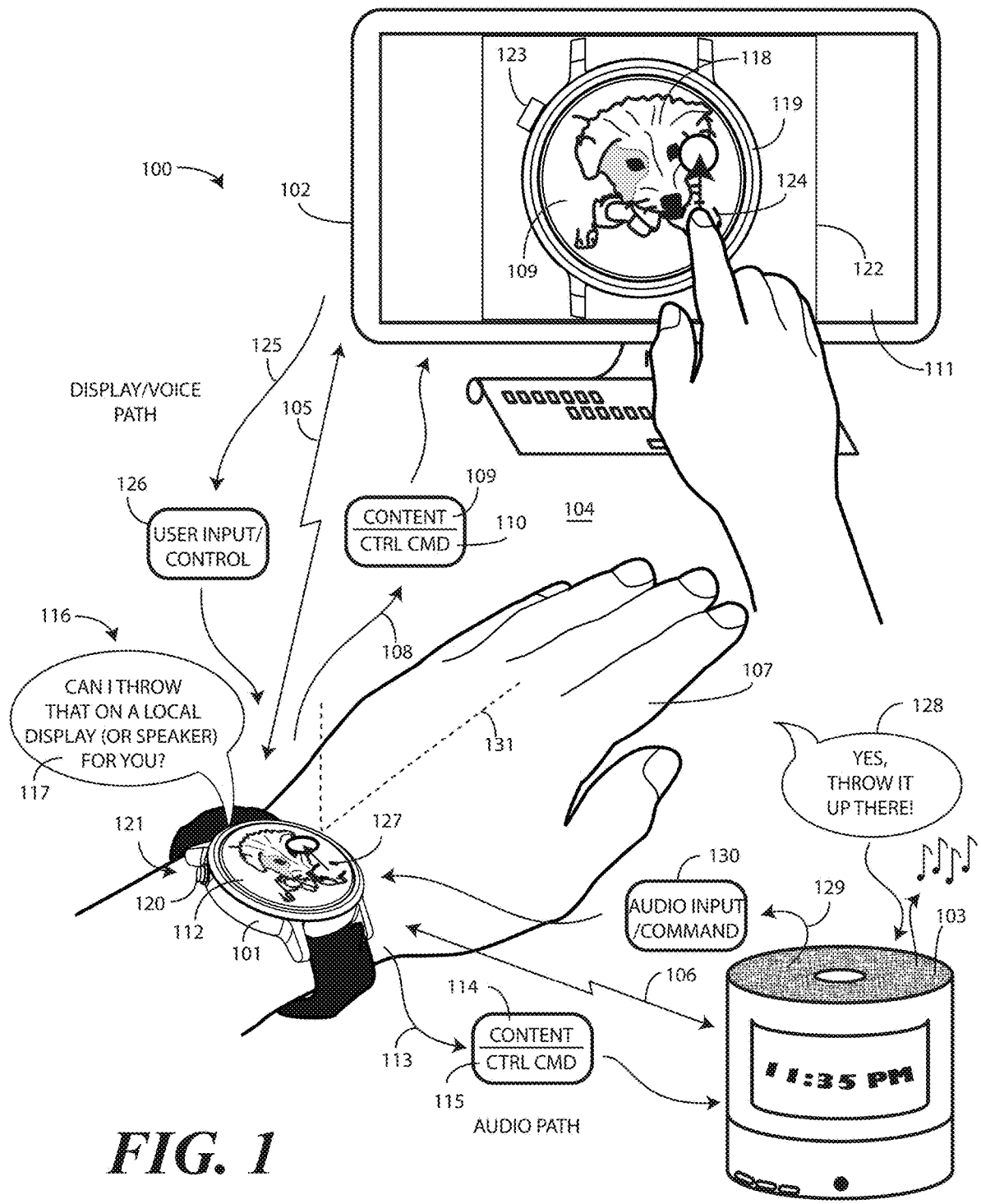
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to replicating a user interface of an electronic device as a graphical user interface on another electronic device. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of detecting external electronic devices, transmitting content comprising a graphical user interface to the external electronic devices, receiving user inputs at the graphical user interface from the external electronic devices, and performing one or more control operations in response to the user inputs as described herein. The non-processor circuits may include, but are not limited to, a radio receiver, a radio transmitter, signal drivers, clock circuits, power source circuits, and user input devices. As such, these functions may be interpreted as steps of a method to perform the automatic replication of a graphical user interface on an external or companion electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." In this document, relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide small electronic devices, such as wearable electronic devices, the simple, ad hoc ability to present content, and optionally a graphical user interface representing a physical user interface of the small electronic devices, on the display of an external or companion electronic device. The electronic device may do this for a variety of reasons. For example, the electronic device may be inaccessible due to the fact that it is in a pocket or other repository container.

Alternatively, a sleeve or other object may be covering the electronic device. In another embodiment, the electronic device may just be farther from a person than is the at least one external electronic device. In still another embodiment, the electronic device may be less capable for a specific task than is the external electronic device. In still another embodiment, the electronic device may be operating under suboptimal conditions, such as in a loud environment, and may prefer to have the external electronic device output content. In still another embodiment, the electronic device may detect a user gazing in the direction of the external electronic device. In another embodiment, each of these factors is assessed, in combination with sensory data pertaining to devices relevant locations, beacons, user detection, device mode of operation, contextual detections, to determine whether to use the user interface of the external electronic device for the presentation of content and receipt of user interactions. Still other reasons to do so will be obvious to those of ordinary skill in the art having the benefit of this disclosure.

Consider the situation where a small electronic device constitutes a smart watch that either includes no display, or alternatively has a small display that makes reading textual content beyond the shortest of messages difficult. Embodiments of the disclosure provide methods and systems that allow this smart watch the ability to present content on the display of an external electronic device having a greater display output capability, as well as present a graphical user interface replicating a physical user interface of the smart watch on the display.

In one or more embodiments, a user can then manipulate one or both of the content and/or the graphical user interface at the external electronic device by delivering user input to the user interface of the external electronic device. The smart watch then receives one or more control commands identifying these user inputs from the external electronic device. One or more processors of the smart watch can then perform one or more control operations on the content or operations of its components as a function of the user inputs. Thus, a user can manipulate the physical controls of the smart watch by "virtually" manipulating representations of those controls presented at the user interface of an external electronic device in one or more embodiments.

In one or more embodiments, when a person enters an environment, such as a room, an apartment, an office, a train, a place of business, or other environment, an electronic device having limited display output capabilities or audio output capabilities, such as may be the case with a wearable electronic device, the electronic device electronically scans the environment for external electronic devices that constitute "companion" electronic devices. A companion device is an external electronic device that allows the electronic device to use its user interface, be it an audio-based, visual-based, or both, to deliver one or both of content and/or a graphical user interface when needed or desired.

In one or more embodiments, when the electronic device discovers such external electronic devices, e.g., a companion external electronic device having a greater display output capability, a greater audio output capability, or both, the electronic device automatically prompts the owner of the electronic device whether employing a user interface of the companion external electronic device would be beneficial. For instance, when presenting visual information on a small display, the electronic device may deliver an audio prompt stating, "Can I throw that on a local display for you?"

If the electronic device receives user input in the affirmative, in one or more embodiments the electronic device establishes a communication connection with the discovered companion external electronic device. For example, the electronic device may open a new window on the discovered companion external electronic device when the electronic deice and the discovered companion external electronic device are in close proximity.

In one or more embodiments, one or more processors of the electronic device then cause its wireless communication device to transmit content and one or more control commands to the discovered companion external electronic device causing the same to output the content to the environment. In one or more embodiments, the content includes a graphical user interface depicting a physical user interface of the electronic device.

In one or more embodiments, both the content and the graphical user interface are editable at the discovered companion external electronic device. For example, a person may deliver touch input to a touch-sensitive display or touch pad of the discovered companion external electronic device to manipulate one or both of the content and/or graphical user interface. In one or more embodiments, the discovered companion external electronic device then transmits one or more other control commands back to the electronic device identifying the received user input.

One or more processors of the electronic device can then perform one or more control operations in response to the user input. For instance, if the content was a photograph and the user input magnified the photograph by "zooming in" via touch input, in one or more embodiments the one or more processors would cause the same photograph to zoom in on the electronic device. If the electronic device was a smart watch with a housing an three external buttons, and a person actuated one of the three buttons depicted in the graphical user interface by delivering touch input at the user interface of the discovered companion external electronic device, in one or more embodiments the one or more processors of the smart watch would perform a control operation as if the person had touched the physical button at the housing of the smart watch itself.

Advantageously, embodiments of the disclosure solve problems when the user interface of a small electronic device is not immediately accessible or is blocked from view. For instance, if the small electronic device were a smart watch that is under a shirt or coat sleeve or placed into a pocket, its display and/or audio outputs would not be conveniently accessible by a person. Accordingly, due to the fact that these user interfaces are covered, the person may not be able to interact with a voice recognition engine of the smart watch, a touch sensitive display of the smart watch, or both.

In this unfortunate situation, embodiments of the disclosure allow the smart watch to seamlessly and automatically present content and receive user input on a display of a discovered companion external electronic device and/or deliver and receive audio content using the audio input and output of the discovered companion external electronic device. In one or more embodiments, and "editable" smart watch content window automatically appears on the display of the discovered companion external electronic device that can be manipulated by a person via user input received by a user interface of the discovered companion external electronic device.

In one or more embodiments, this editable smart watch content window is not simply a mirrored output of the smart watch, but is a live interface for viewing, adding, sharing, and even manipulating the physical controls of the smart watch itself. The editable smart watch content window allows a person to not only read messages on the larger display of the discovered companion external electronic device, rather than hearing them delivered audibly from the smart watch, thereby increasing privacy, but also to manipulate the physical controls of the smart watch by delivering user input to the user interface of the discovered companion external electronic device as if the person were directly interfacing with the physical controls of the smart watch.

In one or more embodiments, if a person owns multiple electronic devices having different display output capabilities, audio output capabilities, or both, and when one of the electronic devices in inaccessible, such as when it is in a pocket or purse, or beyond the reach of the person, embodiments of the disclosure allow content to appear live on other devices. In one or more embodiments, that content includes an editable copy being presented on a discovered companion external electronic device. This allows the person to enlarge, respond, comment, reply, or otherwise interact with content received by the inaccessible electronic device via the user interface of the discovered companion external electronic device.

In one illustrative example, a discovered companion external electronic device, e.g., a laptop computer or tablet computer, is configured to receive interactive data from another electronic device, e.g., a smart watch or smartphone. In one or more embodiments, the discovered companion external electronic device is configured to receive this interactive data automatically. In another embodiment, the electronic device prompts the owner for permission to deliver the interactive data to the discovered companion external electronic device.

In one or more embodiments, where the electronic device and the discovered companion external electronic device are in close proximity to each other, the electronic device wirelessly delivers interactive data to the discovered companion external electronic device. One or more processors of the discovered companion external electronic device receive the interactive data and create a notification or pop-up window/overlay to display the interactive data. A user interface of the discovered companion external electronic device receives interactive input, such as text input from a keyboard or touch interaction from a touch sensitive display or touch sensor interacting with the interactive data.

In one or more embodiments, the discovered companion external electronic device then sends one or more other control commands back to the electronic device identifying the received user input. One or more processors of the electronic device can then perform one or more control operations in response to the user input.

In another embodiment, an electronic device having lesser display output capabilities and/or audio output capabilities initially classifies output data as either audio only output data, or alternatively as audio and visual output data. Similarly, input data is classified as either audio only, e.g., voice input, or interactive input, which may include voice input and other input such as touch input, keyboard strokes, and so forth.

Depending upon what classification is applied to the output data, and what classification of input data is expected, one or more processors of the electronic device then decide whether a user interface of a companion external electronic device would improve the user interface experience. If so, the electronic device identifies one or more companion external electronic devices operating within an environment of the electronic device, transmits content and one or more control commands causing the companion external electronic device to present the output data to the environment, optionally along with a graphical user interface depicting a physical user interface of the electronic. Thereafter, the electronic device receives input data in the form of one or more other control commands transmitted by the companion external electronic device, and performs one or more control operations in response to the input data and/or other control commands.

In still another embodiment, an electronic device includes voice authentication/assistant capabilities. One or more processors of the electronic device process voice commands received by the electronic device. Visual content, however, are delivered to one or more companion external electronic devices for presentation on user interfaces having greater display output capabilities. The user interface of the companion external electronic device receives user interactions, which may be in the form of touch input, mouse clicks, keyboard strokes, stylus interactions, or other inputs. The companion external electronic device then transmits those user interactions to the electronic device for processing.

In one or more embodiments, if a person asks an electronic device to send content to the user interface of a companion external electronic device, and there are multiple companion external electronic devices in the environment, in one or more embodiments all displays of the companion external electronic device present a unique identifier, such as a number, to identify themselves. In one or more embodiments, the electronic asks the person, "Which screen?" The person can deliver the number to the electronic device in the form of a voice command. Thereafter, one or more processors of the electronic device cause its wireless communication device to transmit the content to the selected companion external electronic device.

Advantageously, embodiments of the disclosure provide a proximity-triggered user interface sharing capability between two devices. In one or more embodiments, this functionality is employed when one device has a user interface that is inaccessible, such as when the display of a smart watch is covered by a sleeve or when the smart watch is placed inside a pocket or purse.

Moreover, embodiments of the disclosure provide a proximity-triggered user interface sharing capability that can be used by two devices even though the user interfaces of both devices are fully accessible. In one or more embodiments, a companion external electronic device displays a live, editable version of the user interface of the other device, allowing a person to engage with this virtual user interface with touch input, keyboard input, and so forth, as if the person were interacting with the other device itself.

Embodiments of the disclosure also provide a proximity-triggered user interface sharing capability that can be used by two devices when the user interfaces of both devices are fully accessible by automatically selecting the companion external electronic device closest to a person from a plurality of companion external electronic devices. For example, in one or more embodiments an electronic device uses image capture or sound triangulation to determine a location of the person. Similarly, the locations of the companion external electronic devices can be determined as well, either when the companion external electronic devices transmit their locations, the electronic device determines proximity to the companion external electronic devices by a received signal strength indicator (RSSI) analysis, or by other techniques. Thereafter, the electronic device can deliver the live, editable version of the user interface to the companion external electronic device closest to the person.

Embodiments of the disclosure advantageously provide remote user interface sessions that can be triggered by the user interface needs of small electronic devices or electronic devices devoid of user interface components, such as displays. Embodiments of the disclosure provide wearable electronic devices and other electronic devices, such as a laptop or tablet computer, that can be used together in a hybrid system. In one or more embodiments, voice input can be delivered to the wearable electronic device, while other input, e.g., touch input, keyboard input, and so forth, is delivered to a companion external electronic device in the hybrid system. As such, a person can edit text presented to the user interface of a companion external electronic device in the hybrid system by delivering voice input to the wearable electronic device, and so forth.

Receipt of content, such as receipt of messages, can trigger an electronic device having a lesser user interface capability to scan for companion external electronic devices having greater user interface capabilities. As noted, in one or more embodiments the content presented on the companion external electronic devices includes not only content being presented by an electronic device having lesser user interface capabilities, but also a graphical user interface depicting a physical user interface of the electronic device having the lesser user interface capabilities as well. Voice input received by the electronic device having the lesser user interface capabilities can cause the graphical user interface or the content on the companion external electronic devices having greater user interface capabilities to be modified. Companion external electronic devices can identify themselves, such as by presenting unique identifiers on their displays, for selection by a person. The companion external electronic devices can act as a beacon, thereby providing advertising capabilities.

Other advantages offered by embodiments of the disclosure include the fact that the methods and systems described herein provide for the detection of a person, the detection of available devices around the person, and the seamless automatic proximity triggered pairing between devices as a function of the state of the user interface, the state of devices, e.g., whether they are covered, far from the person, in a hand, etc., relative locations from the person, whether devices are paired, belonging to the person, and so forth. Embodiments of the disclosure automatically present in one or more embodiments, and without manual intervention from a person, fully editable/two way device graphical user interfaces to external electronic devices with those graphical user interfaces optimized to match the sharing device and the local device capability for optimum user engagement. For instance, a simplified graphical user interface of a desktop computer can be presented on the display of a wearable electronic device, with that graphical user interface having only the key elements to control the desktop computer presented on the small screen of the wearable electronic device in one or more embodiments. Other advantages offered by embodiments of the disclosure will be described below. Still others will be obvious to those of ordinary skill in the art having the benefit of this disclosure.

Turning now to FIG. 1, illustrated therein is one explanatory system 100 configured in accordance with one or more embodiments of the disclosure. As shown in FIG. 1, an electronic device 101 is operating in an environment 104 with a first companion external electronic device 102 and a second companion external electronic device 103. The electronic device 101 has established a paired communication connection 105 with the first companion external electronic device 102, and another paired communication connection 106 with the second companion external electronic device 103.

In this illustrative embodiment, the electronic device 101 is shown as a wearable electronic device that is configured as a smart watch. The first companion external electronic device 102 is a desktop computer, while the second companion external electronic device 103 is a voice assistant. These types of electronic devices are illustrative only, as each of the electronic device 101, the first companion external electronic device 102, and the second companion external electronic device 103 could be configured as other types of electronic devices as well. For example, the electronic device 101 could be configured as a fitness tracking wearable device devoid of a display, while the first companion external electronic device 102 is configured as a tablet computer, with the second companion external electronic device 103 being configured as a gaming console, and so forth.

Also, in the illustrative embodiment of FIG. 1, three devices are shown. However, embodiments of the disclosure are not so limited. Embodiments of the disclosure contemplate that a person 107, shown here as the owner and authorized user of each of the electronic device 101, the first companion external electronic device 102, and the second companion external electronic device 103, may own any number of electronic devices of any number of types, each of which can established paired communication connections with the other devices. Thus, while three electronic devices are shown in the system 100 of FIG. 1, other systems could include two electronic devices, four electronic devices, or more electronic devices.

In one or more embodiments, when the electronic device 101 enters the environment 104, it detects, with a wireless communication device, at least one external electronic device operating within the environment 104. The electronic device 101 can detect the external electronic devices in any of a number of ways. In one or more embodiments, the electronic device 101 transmits a communication signal as a discovery beacon requesting that other electronic devices in the environment 104 respond with an identifier communication and a device type communication. Other techniques for detecting the external electronic devices operating within the environment 104 will be obvious to those of ordinary skill in the art having the benefit of this disclosure.

In this illustrative example, the electronic device 101 detects the first companion external electronic device 102 and the second companion external electronic device 103. In one or more embodiments, upon detecting the first companion external electronic device 102 and the second companion external electronic device 103, the electronic device 101 establishes a paired communication connection 105,106 with each of the first companion external electronic device 102 and the second companion external electronic device 103. In one or more embodiments, the paired communication connections 105,106 are peer-to-peer communication connections, such as device-to-device communication connections using the Bluetooth.sup.™ or other similar protocol. In other embodiments, the paired communication connections 105,106 are networked communications through a router, node, hub, or other intermediate hardware. Other examples of paired communication connections 105,106 that can be established between the electronic device 101 and the first companion external electronic device 102 and the second companion external electronic device 103 will be obvious to those of ordinary skill in the art having the benefit of this disclosure.

In one or more embodiments, one or more processors of the electronic device 101 cause a wireless communication device of the electronic device 101 to transmit content 109 and one or more control commands 110 from the electronic device 101 to, for example, the first companion external electronic device 102. In one or more embodiments, the one or more control commands 110 cause the companion external electronic device 102 to output the content 109 to the environment 104. In this illustrative embodiment, the one or more processors of the electronic device 101 also cause the wireless communication device of the electronic device 101 to transmit 113 content 114 and one or more control commands 115 to the second companion external electronic device 103 as well.

In one or more embodiments, the one or more processors of the electronic device 101 cause the wireless communication device of the electronic device 101 to transmit 108 the content 109 and/or one or more control commands 110 from the electronic device 101 to the first companion external electronic device 102, and/or to transmit 113 the content 114 and one or more control commands to the second companion external electronic device 103, only when the one or more processors make a determination indicating that presentation of the content 109 would be enhanced if done at a user interface of an external electronic device. For instance, in the illustrative embodiment of FIG. 1 the first companion external electronic device 102 has a greater display capability than the electronic device 101 due to the fact that the first desktop computer has a large, high-resolution display 111, while the electronic device 101, being a wearable electronic device, has a display 112 that is quite small. Similarly, the second companion external electronic device 103 has a greater audio output capability than the electronic device 101 due to the fact that the audio transducers of the voice assistant are larger and are powered by a wall outlet, while the audio transducers of the smart watch are small and are battery-powered.

In one or more embodiments, prior to transmitting 108, 113 any content 109,114 or control commands 110,115 to either the first companion external electronic device 102 or the second companion external electronic device 103, the one or processors of the electronic device 101 classify the content 109,114 by type. Illustrating by example, in one or more embodiments the content 109,114 can be classified as visual output, audio output, or a combination thereof. In the illustrative embodiment of FIG. 1, content 109 comprises visual output in the form of a photograph of the person's dog, Buster. Content 114 comprises audio output, which in this example is music.

In one or more embodiments, the one or more processors of the electronic device 101 can also classify any expected inputs received from user interfaces of either the first companion external electronic device 102 or the second companion external electronic device 103 by type as well. Since the first companion external electronic device 102 is a desktop computer with a keyboard and touch-sensitive display 111, the one or more processors of the electronic device 101 may conclude that any inputs received from the first companion external electronic device 102 will be primarily tactile in nature, e.g., keystrokes, touch input, stylus input, and so forth. By contrast, since the second companion external electronic device 103 is configured as a voice assistant, the one or more processors of the electronic device 101 may conclude that any input received from the second companion external electronic device 103 will be audio input in the form of voice commands, and so forth.

In one or more embodiments, depending on the output classification and expected input classification, the one or more processors of the electronic device 101 make a decision regarding which content to send to which device. In this illustration, visual content, e.g., content 109, is delivered to the first companion external electronic device 102, while audio content, e.g., content 114, is delivered to the second companion external electronic device 103. Note that while the desktop computer likely includes loudspeakers and microphones as well, in this illustrative embodiment the one or more processors of the electronic device 101 made the decision to send audio content to the second companion external electronic device 103, due to the fact that it is also operating within the environment 104 and likely has better loudspeakers and microphones than the first companion external electronic device 102.

While this classification outputs and inputs and selection of devices based upon the classification is one way in which the system 100 can function, embodiments of the disclosure are not so limited. In another embodiment, both audio and visual content could be sent to the first companion external electronic device 102. In still another embodiment, such as one in which the electronic device 101 and the first companion external electronic device 102 were the only electronic devices operating within the environment 104, visual content could be sent to the first companion external electronic device 102 while audio content is delivered to the environment by the electronic device 101. Similarly, in another embodiment, such as when only the electronic device 101 and the second companion external electronic device 103 are operating in the environment, visual content could be presented on the display 112 of the smart watch while audio content is delivered to the voice assistant, and so forth. Other configurations for the system 100 will be obvious to those of ordinary skill in the art having the benefit of this disclosure.

In one or more embodiments, when multiple external electronic devices are detected operating in the environment 104, one or more processors of the electronic device 101 detect this fact using a wireless communication device. Thereafter, the person 107, authorized user, or owner of the electronic device 101 is allowed to choose which electronic device should receive content generally, or alternatively content that has been classified by the one or more processors of the electronic device 101. One such embodiment will be described below in more detail with reference to FIG. 8. In the illustrative embodiment of FIG. 1, the one or more processors of the electronic device 101 decide which companion external electronic device to send which content automatically. In this example, visual content, e.g., content 109, is transmitted 108 to the first companion external electronic device 102, while audio content, e.g., content 114, is transmitted 113 to the second companion external electronic device 103.

In one or more embodiments, prior to transmitting 108, 113 any content 109,114, one or more processors of the electronic device 101 prompt 116 the person 107 for permission to do so. In the illustrative embodiment of FIG. 1, the one or more processors of the electronic device 101 cause an audio transducer to deliver audio output 117 in the form of a question, asking, "Can I throw that on a local display (or speaker) for you?"

In this illustration, the one or more processors of the electronic device 101 cause the audio transducer to deliver the audio output 117 automatically upon detecting the first companion external electronic device 102 and the second companion external electronic device 103, each having superior output capabilities than the electronic device 101, operating within the environment 104. However, in other embodiments, the one or more processors of the electronic device 101 can prompt the person 107 in response to user input from the person received by the electronic device.

For instance, if the person 107 asks the electronic device 101, via a voice command, to do something that would benefit from a large, touch-sensitive display 111, for example, in response to this voice command the one or more processors of the electronic device 101 may cause the audio transducer to deliver audio output 117 in the form of a question, asking, "Can I throw that on a local display for you?" Thereafter, in one or more embodiments the one or more processors of the electronic device 101 cause the wireless communication device to establish a paired communication connection 105 with the desired external electronic device, here the first companion external electronic device 102, and content 109 is delivered thereto.

In this illustrative embodiment, the second companion external electronic device 103 has a greater audio output capability than does the electronic device 101. Accordingly, in one or more embodiments where the content 114 comprises audio content, the one or more processors of the electronic device 101 transmit 113 this content 114 to the second companion external electronic device 103.

In this illustrative embodiment, the first companion external electronic device 102 has a greater display output capability than does the electronic device 101. Accordingly, in one or more embodiments where content 109 comprises visual content, e.g., a photograph 118 of Buster in this illustrative embodiment, the one or more processors of the electronic device 101 transmit 108 this content 109 to the first companion electronic device 102.

In one or more embodiments, the content 109 also comprises a graphical user interface 119. Such is the case in FIG. 1. As noted above, the electronic device 101 is configured as a smart watch. The smart watch has a physical user interface 121 that includes one or more physical control devices, e.g., button 120, and the display 112, which in this case is touch-sensitive. In one or more embodiments, the graphical user interface 119 depicts the physical user interface 121 on the display 111 of the first companion external electronic device 102. In this illustrative embodiment, the graphical user interface 119 depicts the physical user interface 121 of the electronic device 101 presenting other content to the environment 104, which in this case is a photograph 118.

In one or more embodiments, when the electronic device 101 sends visual content, e.g., content 109, to the first companion external electronic device 102 along with one or more control commands 110 instructing the first companion external electronic device 102 to present the visual content on the display 111, the first companion external electronic device 102 causes a window 122 to open. In this illustrative embodiment, the window 122 is emulating the display 112 of the electronic device 101. Since the content 109 comprises both the photograph 118 and the graphical user interface 119 depicting the physical user interface 121 of the electronic device, this window 122 allows for touch input and other user input to interact with the emulated display 112 of the electronic device 101 being presented on the larger display 111 of the first companion external electronic device 102. For example, the photograph 118 can be edited, zoomed, or swapped for other photographs when touch input or other user input is received at the user interface of the first companion external electronic device 102. Similarly, the person 107 can deliver touch input at a virtual button 123 of the graphical user interface 119 to cause control operations to occur in the electronic device 101 just as if the physical button 120 had been actuated at the physical user interface 121.

As shown in FIG. 1, the person 107 is delivering touch input 124 to the display 111 of the first companion external electronic device 102. In one or more embodiments, one or more processors of the first companion external electronic device 102 then transmit 126 other control commands 126 identifying this touch input 124 as user input to the electronic device 101. The electronic device 101 receives, with its wireless communication device, the one or more other control commands 126 identifying the touch input 124 in response to the first companion external electronic device 102 presenting the content 109 to the environment 104 and receiving the touch input 124 at the user interface of the first companion external electronic device 102. In one or more embodiments, the one or more processors of the electronic device 101 then perform one or more control operations 127 on the content 109 as a function of the one or more user inputs, here, touch input, identified by the one or more other control commands 126.

The control operations performed by the one or more processors of the electronic device 101 can vary, and will be a function of the one or more user inputs identified by the one or more other control commands 126. For example, in the illustrative embodiment of FIG. 1, the touch input 124 occurs initially at a first position within the photograph 118 and then slides to another position. This touch input 124 causes the photograph 118 to pan in the graphical user interface 119 presented in the window 122. Accordingly, the one or more processors of the electronic device 101 cause the photograph to pan on the display 112 of the electronic device 101 as if the touch input 124 were received at the display 112 of the electronic device 101 rather than the display 111 of the first companion external electronic device 102.

In similar fashion, touch input could be received at the user interface of the first companion external electronic device 102 to edit the photograph 118, zoom into the photograph 118, zoom out of the photograph 118, move to a new photograph 118, and so forth. In effect, any control operation that would occur as a result of the touch input 124 being delivered to the display 112 of the electronic device 101 can occur when that touch input 124 is delivered to the graphical user interface 119 presented on the display 111 of the first companion external electronic device 120 of the system 100 of FIG. 1 in one or more embodiments.

In addition to manipulating the photograph, in one or more embodiments the graphical user interface 119 allows for actuation of controls and other physical devices of the electronic device 101 as well in one or more embodiments. In the illustrative embodiment of FIG. 1, since the content 109 includes not only the photograph 118 but also the depiction of the physical user interface 121 of the electronic device 101, the person 107 could deliver touch input 124 to the virtual button 123 to perform whatever control operation at the electronic device 101 that would be performed if the actual physical button 120 was pressed.

Thus, in one or more embodiments the graphical user interface 119 is not just streaming video, pictures, or other content from the electronic device 101. To the contrary, it provides a larger graphical user interface 119 that not only presents the content, but depicts the physical user interface 121 of the electronic device 101 to allow for virtual manipulation of physical controls of the physical user interface 121 by delivering touch input to the user interface of the first companion external electronic device 102 in one or more embodiments. The embodiment of FIG. 1 provides the electronic device 101 with a simple, ad hoc capability to deliver both content, e.g., photograph 118, and a graphical user interface 119, optionally depicting a physical user interface 121 of the electronic device 101, to the nearest and best display 111, either automatically or in response to user requests, in one or more embodiments. Thus, if the electronic device 101 includes a display 112 that is too small for the person 107 to adequately see the photograph 118, the electronic device 101 can take advantage of better output display capabilities in the environment 104 to provide the person 107 with a better user experience.

Audio content can be processed in similar fashion. Recall from above that in one embodiment, the electronic device 101 prompted 116 the person 107 with audio output 117 in the form of a question, asking, "Can I throw that on a local display for you?" In the illustrative embodiment of FIG. 1, the person 107 delivers audio input 128 in the form of a voice command, stating, "Yes, throw it up there!" In the illustrative embodiment of FIG. 1, the second companion external electronic device 103 receives this audio input 128.

In one or more embodiments, one or more processors of the second companion external electronic device 103 then transmit 129 other control commands 130 identifying this audio input 128 as user input to the electronic device 101. The electronic device 101 receives, with its wireless communication device, the one or more other control commands 130 identifying the audio input 128 in response to the second companion external electronic device 103 receiving the same. In one or more embodiments, the one or more processors of the electronic device 101 then perform one or more control operations as a function of the one or more user inputs identified by the one or more other control commands 130. In this illustration, the one or more processors of the electronic device 101 transmit 108 the content 109 and one or more control commands 110 to the first companion external electronic device 102.

In one or more embodiments, prior to detecting the first companion external electronic device 102 and the second companion external electronic device 103 operating within the environment 104, the one or more processors of the electronic device scan 131, with the wireless communication device, the environment 104. For instance, when the person 107 walks into the environment 104, the one or more processors of the electronic device 101 can scan 131 the environment 104 to discover whether any external electronic devices are operating within the environment 104. In one or more embodiments, the one or more processors of the electronic device 101 scan 131 the environment for one or more external electronic devices having one or both of a greater display output capability than the electronic device 101 or a greater audio output capability than the electronic device 101.

In one or more embodiments, the one or more processors of the electronic device 101 receive audio input 128 or touch input defining a user command requesting the presentation of content 109 on at least one external device. Where this occurs, e.g., where audio input 128 was received directly at the electronic device 101 prior to the electronic device 101 discovering the first companion external electronic device 102 and the second companion external electronic device 103, in one or more embodiments the scanning 131 occurs in response to, or as a result of, this user input command.

Viewing the system 100 of FIG. 1 from the perspective of the first companion external electronic device 102, a wireless communication device of the first companion external electronic device 102 receives content 109 and one or more control commands 110 from the electronic device 101 when both the first companion external electronic device 102 and the electronic device 101 are operating within the environment. The display 111 of the first companion external electronic device 102 then presents the content 109 to the environment in response to the one or more control commands 110. As shown in FIG. 1, the content comprises a graphical user interface 119 depicting a physical user interface 121 of the electronic device.

As shown in FIG. 1, the first companion external electronic device 102 then receives, with its user interface, one or more user inputs in response to the presentation of the content 109 to the environment 104. In FIG. 1, the one or more user inputs comprise the touch input 124 and the user interface comprises the touch-sensitive display 111. The touch input 124 comprises one or more user interactions with the depiction of the physical user interface 121 of the electronic device 101, as the touch input 124 is interacting with a visual depiction of the display 112 of the electronic device 101.

Thereafter, the wireless communication device of the first companion external electronic device 102 transmits one or more other control commands 126 identifying the one or more user inputs back to the electronic device 101. Advantageously, the system 100 of FIG. 1 not only projects content 109 on another device, but allows the person 107 to manipulate the content 109 via the first companion external electronic device 102 as if they were interacting with the physical user interface 121 of the electronic device 101 itself. Where the first companion external electronic device 102 and the second companion external electronic device 103 are equipped with preloaded software to enable the presentation of the window 122 (for the first companion external electronic device 102) or the receipt of audio input 128 (for the second companion external electronic device 103), the system 100 becomes a hybrid, seamless, proximity-triggered user interface sharing system for the electronic device 101 and the first companion external electronic device 102 and the second companion external electronic device 103 that allows the first companion external electronic device 102 to present a live, editable version of the physical user interface 121 of the electronic device 101 while the second companion external electronic device 103 received audio inputs 128. The person 107 is able to engage with the live, editable version of the physical user interface 121, such as by touching, typing, and so forth, despite the fact that the content 109 is being controlled by the one or more processors of the electronic device 101.

Figure 2:
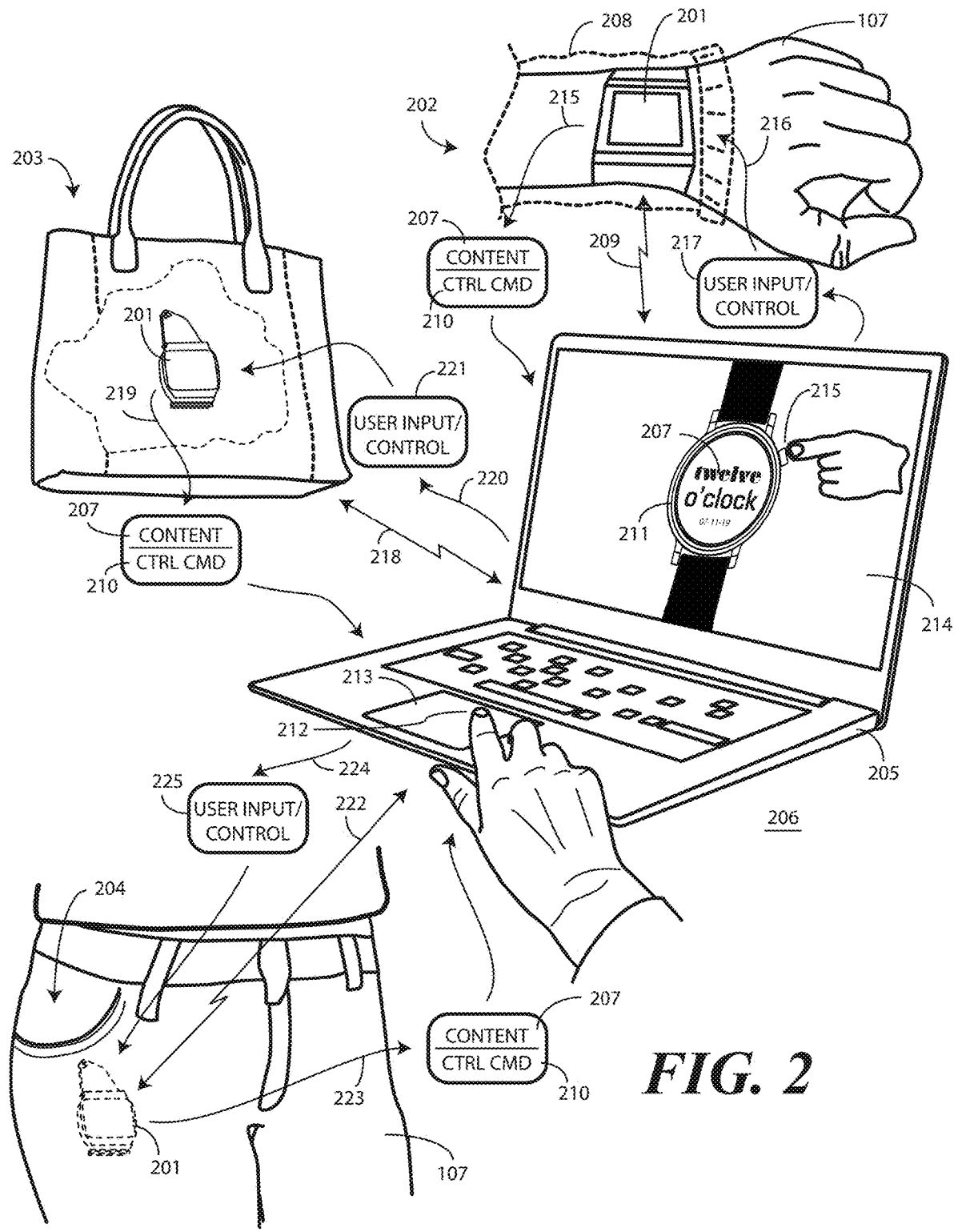
FIG. 2 illustrates another explanatory system in accordance with one or more embodiments of the disclosure.

Turning now to FIG. 2, in one or more embodiments the operations of FIG. 1 can be triggered by certain electronic device conditions. Embodiments of the disclosure contemplate that there will be situations in which the user interface of an electronic device 201 is not available for user interaction or for a person 107 to see or hear. For example, in a first situation 202 the electronic device 201 may be covered by a sleeve, other garment portion, or other objection. In another situation 203, the electronic device 201 may be disposed within a purse. In still another situation 204, the electronic device 201 may be disposed within a pocket or other receptacle. In one or more embodiments, the electronic device 201 is configured to detect these situations 202,203, 204 and use the detection of the same to begin the search for remote electronic devices 205 operating within an environment 206 of the electronic device 201 that have user interfaces into which the electronic device 201 can tap to present content 207.

Illustrating by example, in a first situation 202 shown in FIG. 2 the electronic device 201 is covered by a sleeve 208. In one or more embodiments, the one or more processors of the electronic device 201 can detect this situation 202 and begin scanning for external devices 205 with user interfaces to commandeer. Illustrating by example, one or more sensors of the electronic device 201 can initially detect whether the person 107 is wearing the electronic device 20. A galvanic skin sensor, or touch sensor such as a capacitive, infrared, pressure, or thermal sensor, might determine that a person 107 is wearing the electronic device 201 on their wrist, for example. Alternatively, a tension sensor can be used in conjunction with the strap of the electronic device 201 to determine whether the tension applied to the strap exceeds a predetermined threshold corresponding to a strap that has been secured about a wearer's limb, and so forth.

Other sensors can then determine whether the electronic device 201 is covered. For instance, an infrared sensor or ambient light sensor can be used to determine that the electronic device 201 has been covered for an extended period of time. If the person 107 straps the electronic device 201 to a wrist, and then covers the device with a sleeve 208, the second sensor or sensors can be configured to detect such coverage.

Once the second sensor or sensors detects that the electronic device 201 has been covered, additional sensors can be used to prevent false positive coverage detection. For example, an array of microphones in the electronic device 201 can detect a noise profile corresponding to a clothing object covering the electronic device. The microphones may also detect an altered or muffled sound caused by the sleeve 208. Alternatively, the microphones may detect an altered acoustical spectrum during operation. If, for instance, an on-board loudspeaker emits a sound, the microphones may detect that the clothing is altering the acoustic spectrum associated with this sound. This additional check provides a further confirmation that the object covering the electronic device 201 is clothing, as opposed to a situation where the electronic device 201 is merely placed in a box or drawer.

Where the confirmation check indicates that clothing is indeed covering the electronic device 201, one or more processors of the electronic device 201 can cause a wireless communication device of the electronic device 201 to identify 209 one or more external electronic devices 205 operating within an environment 206 of the electronic device 201. The one or more processors of the electronic device can cause the wireless communication device to transmit 215 content 207 and one or more control commands 210 causing the external electronic device 205 to present a graphical user interface 211 depicting a physical user interface of the electronic device 201 to the environment 206.

In the illustrative embodiment of FIG. 2, the electronic device 201 comprises a wearable electronic device. Accordingly, the graphical user interface 211 of FIG. 2 comprises a depiction of the electronic device 201.

In the illustrative embodiment of FIG. 2, the external electronic device 205 is a laptop computer. The person 107 is delivering touch input 212 to a touch sensitive surface 213 of the laptop computer. In this illustration, the touch input 212 comprises a user interaction with a depiction of the physical user interface of the electronic device 201 on the display 214 of the laptop computer. In this example, the touch input 212 is interacting with a virtual button 215 of the depiction of the electronic device 201 in the user interface 211.

In one or more embodiments, the wireless communication device of the electronic device then receives 216 one or more other control commands 217 identifying the user inputs, here, the touch input 212, interacting with the graphical user interface 211 at the external electronic device 205. In one or more embodiments, the one or more processors of the electronic device 201 then perform one or more control operations in response to the one or more control commands 217. Accordingly, in this example the one or more processors would perform a control operation as if a physical button on the physical user interface had been physically pressed.

At situation 203, the electronic device 201 has been placed in a purse. In one or more embodiments, the one or more processors of the electronic device 201 can detect this situation 203 and begin scanning for external devices 205 with user interfaces to commandeer. Illustrating by example, in one embodiment one or more sensors of the electronic device 201 detect that the electronic device 201 is situated within the purse as a function of detecting one or more of an intensity of received ambient light being below a predefined threshold, an absence of touch sensor actuation along a housing of the electronic device 201, and/or an approximately common temperature occurring at both a first location of the electronic device 201 and a second location of the electronic device 201. The one or more sensors of the electronic device 201 detect that the electronic device 201 is situated within the purse further as a function of motion of the electronic device 201, as an electronic device disposed within a repository container will tend to exhibit approximate rotational stability, which is in contrast to situations where it continually changes hands, is in the hand of a user who is walking, or is picked up from a table, where the electronic device 201 would change directions from up to down to angled and so forth.

In one embodiment, when these or other conditions are met, one or more processors of the electronic device 201 operable with the one or more sensors detect that the electronic device 201 is in a repository container, such as a purse, rather than another location, such as in their hand, on a table, or disposed within a drawer. In one embodiment, the one or more processors of the electronic device 201 can optionally perform a control operation in response to detecting the electronic device 201 is disposed within the repository container.

For instance, the one or more processors of the electronic device 201 cause a wireless communication device of the electronic device 201 to identify 218 one or more external electronic devices 205 operating within an environment 206 of the electronic device 201. The one or more processors of the electronic device can cause the wireless communication device to transmit 219 content 207 and one or more control commands 210 causing the external electronic device 205 to present a graphical user interface 211 depicting a physical user interface of the electronic device 201 to the environment 206.

Upon receiving touch input 212 at a touch sensitive surface 213 of the external electronic device 205, the external electronic device 205 can transmit 220 one or more other control commands 221 identifying the user inputs, which are received by the electronic device 201. In one or more embodiments, the one or more processors of the electronic device 201 then perform one or more control operations in response to the one or more control commands 221 as previously described.

At situation 204, the electronic device 201 has been placed in a pocket. In one or more embodiments, the one or more processors of the electronic device 201 can detect this situation 204 and begin scanning for external devices 205 with user interfaces to commandeer.

Illustrating by example, in one embodiment one or more sensors of the electronic device 201 can detect that the electronic device 201 is disposed within the pocket as a function of detecting a particular motion of the electronic device 201, an absence of any finger touch along a housing of the electronic device 201, and detecting approximately a common temperature at both a first location of the electronic device and a second location of the electronic device 201. The first location and the second location can be on the same side of the electronic device 201, or alternatively can be on different sides or ends of the electronic device 201.

In one embodiment, when these or other conditions are met, one or more processors of the electronic device 201 that are operable with the one or more sensors detect that the electronic device 201 is in a user's pocket rather than another location, such as in their hand, on a table, or disposed within a drawer. In one or more embodiments, the one or more processors of the electronic device 201 can cause a wireless communication device of the electronic device 201 to identify 222 one or more external electronic devices 205 operating within an environment 206 of the electronic device 201. The one or more processors of the electronic device can cause the wireless communication device to transmit 223 content 207 and one or more control commands 210 causing the external electronic device 205 to present a graphical user interface 211 depicting a physical user interface of the electronic device 201 to the environment 206.

Upon receiving touch input 212 at a touch sensitive surface 213 of the external electronic device 205, the external electronic device 205 can transmit 224 one or more other control commands 225 identifying the user inputs, which are received by the electronic device 201. In one or more embodiments, the one or more processors of the electronic device 201 then perform one or more control operations in response to the one or more control commands 221 as previously described.

Figure 3:
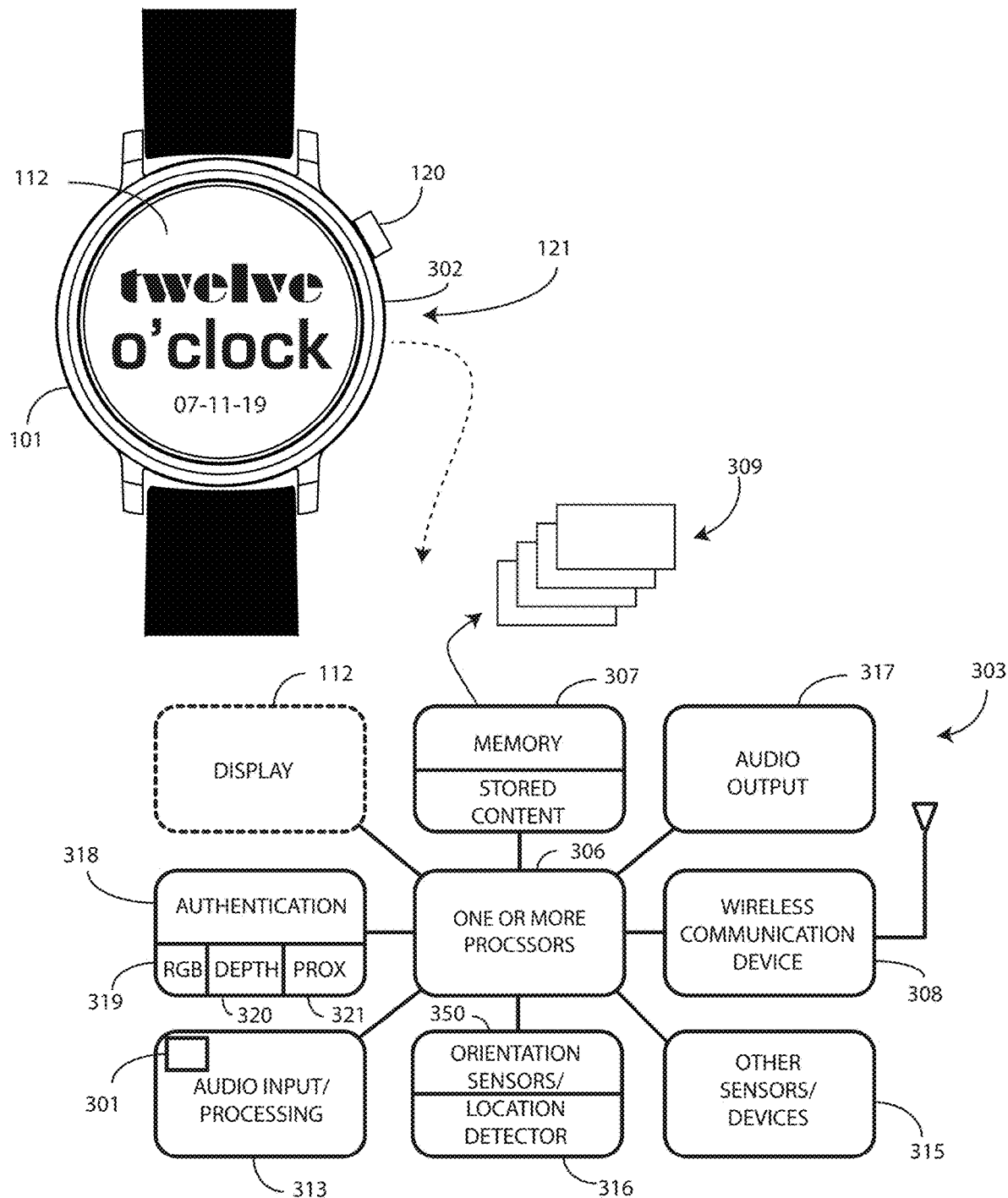
FIG. 3 illustrates one explanatory electronic device in accordance with one or more embodiments of the disclosure.

Turning now to FIG. 3, illustrated therein is one explanatory embodiment of an electronic device 101 configured in accordance with one or more embodiments of the disclosure. The illustrative electronic device 101 of FIG. 3 is configured as a wearable electronic device. In one embodiment, the wearable electronic device is configured as a smart watch. While a wearable electronic device is one configuration for the electronic device 101, the electronic device 101 could be configured in other ways as well. For example, the electronic device 101 could be a smartphone, a tablet computer, a multimedia player, or a gaming device. Other types of electronic devices suitable for embodiments of the disclosure will be obvious to those of ordinary skill in the art having the benefit of this disclosure.

In one or more embodiments, the electronic device 101 comprises a physical user interface 121. In one or more embodiments, the physical user interface 121 comprises a housing 302, which may optionally be touch sensitive, and one or more straps that allow the electronic device 101 to be worn around a wrist as a watch or folded over and clipped to a garment. In one or more embodiments, the physical user interface 121 further comprises a display 112, which may optionally be touch-sensitive. In one embodiment, users can deliver user input to the display of such an embodiment by delivering touch input from a finger, stylus, or other objects disposed proximately with the display 112. In one embodiment, the display 112 is configured as an active matrix organic light emitting diode (AMOLED) display. However, it should be noted that other types of displays, including liquid crystal displays, suitable for use with the physical user interface 121 would be obvious to those of ordinary skill in the art having the benefit of this disclosure.

In one or more embodiments, the physical user interface 121 further comprises one or more mechanical or electromechanical controls, such as button 120. In one embodiment, manipulating the button 120 in a predetermined manner causes one or more processors 306 of the electronic device 101 to perform a control operation. For example, pressing the button 120 may cause the one or more processors 306 of the electronic device 101 to perform a first control operation, while pulling the button 120 may cause the one or more processors 306 of the electronic device 101 to perform another control operation. Rotating the button 120 clockwise may cause the one or more processors 306 of the electronic device 101 to perform a third control operation, while rotating the button 120 counter clockwise causes the one or more processors 306 of the electronic device 101 to perform a fourth control operation, and so forth.

While one button 120 is shown in FIG. 3 for ease of illustration, it should be noted that the electronic device 101 could include two, three, four, or more buttons. Additionally, in addition to, or instead of, the button 120, the physical user interface 121 could include other mechanical or electromechanical components, including touch-sensitive surfaces, sliders, rockers, or other devices.

Also illustrated in FIG. 3 is one explanatory block diagram schematic 303 of the electronic device 101. In one or more embodiments, the block diagram schematic 303 is configured as a printed circuit board assembly disposed within the housing 302 or one or more straps of the electronic device 101. Various components can be electrically coupled together by conductors or a bus disposed along one or more printed circuit boards. It should be noted that the block diagram schematic 303 includes many components that are optional, but which are included in an effort to demonstrate how varied electronic devices configured in accordance with embodiments of the disclosure can be.

Illustrating by example, in one or more embodiments the electronic device 101 includes an audio input/processor 313 to receive audio input and an audio output device 317 to deliver audio output. Where the electronic device 101 is configured to be purely a voice assistant device, a display 112 would be optional, in that it is not required for this voice-based user interaction convention. As such, in one or more embodiments the physical user interface 121 of the electronic device 101 is devoid of a display 112, while in other embodiments the display 112 is included. The fact that the physical user interface 121 of the electronic device 101 can be devoid of the display 112 is illustrated in FIG. 3 by way of the display 112 being shown in dashed line.

Accordingly, it is to be understood that the block diagram schematic 303 of FIG. 3 is provided for illustrative purposes only and for illustrating components of one electronic device 101 in accordance with embodiments of the disclosure. The block diagram schematic 303 of FIG. 3 is not intended to be a complete schematic diagram of the various components required for an electronic device 101, be it a wearable electronic device or another electronic device. Therefore, other electronic devices in accordance with embodiments of the disclosure may include various other components not shown in FIG. 3, or may include a combination of two or more components or a division of a particular component into two or more separate components, and still be within the scope of the present disclosure.

Embodiments of the disclosure contemplate that the number and arrangement of such components can change depending on the particular application. For example, an electronic device 101 may have fewer, or different, components from another electronic device configured in accordance with embodiments of the disclosure. An electronic device 101 configured as a dedicated voice assistant may have fewer, or different, components from a smartphone, and so forth. Accordingly, electronic devices configured in accordance with embodiments of the disclosure can include some components that are not shown in FIG. 3, and other components that are shown may not be needed and can therefore be omitted.

In one embodiment, the electronic device 101 includes one or more processors 306. In one embodiment, the one or more processors 306 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 303. Each of the application processor and the auxiliary processor(s) can be configured to process and execute executable software code to perform the various functions of the electronic device 101. A storage device, such as memory 307, can optionally store the executable software code used by the one or more processors 306 during operation.

In this illustrative embodiment, the block diagram schematic 303 also includes a communication device 308 that can be configured for wired or wireless communication with one or more other devices or networks. The networks can include a wide area network, a local area network, and/or personal area network. The communication device 308 may also utilize wireless technology for communication, such as, but are not limited to, peer-to-peer or ad hoc communications such as HomeRF, Bluetooth.sup.™ and IEEE 802.11 (a, b, g or n), and other forms of wireless communication such as infrared technology. The communication device 308 can include wireless communication circuitry, one of a receiver, a transmitter, or transceiver, and one or more antennas.

In one embodiment, the one or more processors 306 can be responsible for performing the primary functions of the electronic device 101. The executable software code used by the one or more processors 306 can be configured as one or more modules 309 that are operable with the one or more processors 306. Such modules 309 can store instructions, control algorithms, and so forth.

In one or more embodiments, the block diagram schematic 303 includes an audio input/processor 313. The audio input/processor 313 is operable to receive audio input from a source, such as a person, authorized user, plurality of persons within an environment about the electronic device 101, from the environment about the electronic device 101, or combinations thereof. The audio input/processor 313 can include hardware, executable code, and speech monitor executable code in one embodiment. The audio input/processor 313 can be operable with one or more predefined authentication references stored in memory 222.

The predefined authentication references can comprise representations of basic speech models, representations of trained speech models, or other representations of predefined audio sequences that are used by the audio input/processor 313 to receive and identify speech captured by an audio input device 301. In one embodiment, the audio input/processor 313 can include a voice recognition engine. Regardless of the specific implementation utilized in the various embodiments, the audio input/processor 313 can access various speech models stored with the predefined authentication references to identify speech commands.

Various sensors 315 can be operable with the one or more processors 306. A first example of a sensor that can be included with the various sensors 315 is a touch sensor. The touch sensor can include a capacitive touch sensor, an infrared touch sensor, resistive touch sensors, thermal touch sensor, or another touch-sensitive technology.

Another example of a sensor 315 is a geo-locator that serves as a location detector 316. In one embodiment, location detector 316 is able to determine location data. Location can be determined by capturing the location data from a constellation of one or more earth orbiting satellites, or from a network of terrestrial base stations to determine an approximate location. The location detector 316 may also be able to determine location by locating or triangulating terrestrial base stations of a traditional cellular network, such as a CDMA network or GSM network, or from other local area networks, such as Wi-Fi networks.

One or more motion detectors can be configured as an orientation detector 350 that determines an orientation and/or movement of the electronic device 101 in three-dimensional space. Illustrating by example, the orientation detector 350 can include an accelerometer, gyroscopes, or other device to detect device orientation and/or motion of the electronic device 101.

The orientation detector 350 can determine the spatial orientation of the electronic device 101 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 101.

An imager processor system 318 can be included in the electronic device 101 and can be operable with the one or more processors 306. The imager processor system can include one or more sensors. For example, in one or more embodiments the one or more sensors included with the imager processor system 318 comprise one or more of an imager 319, a depth imager 320, and, optionally, one or more proximity sensors 321.

In one embodiment, the imager 319 comprises a two-dimensional imager configured to receive at least one image of an environment about the electronic device 101. In one embodiment, the imager 319 comprises a two-dimensional Red-Green-Blue (RGB) imager. In another embodiment, the imager 319 comprises an infrared imager. Other types of imagers suitable for use as the imager 319 of electronic device 101 will be obvious to those of ordinary skill in the art having the benefit of this disclosure.

The one or more proximity sensors 321, where included, can take various forms. In one or more embodiments, the one or more proximity sensors 321 fall in to one of two camps: active proximity sensors and "passive" proximity sensors. Either the proximity detector components or the proximity sensor components can be generally used for detecting persons being present within the environment, distances between warm objects and the electronic device 101, changes in distance between warm objects and the wearable electronic device, and other information.

As used herein, a "proximity sensor component" comprises a signal receiver only that does not include a corresponding transmitter to emit signals for reflection off an object to the signal receiver. Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

As with the one or more proximity sensors 321, the depth imager 320, where included, can take a variety of forms. In a first embodiment, the depth imager 320 comprises a pair of imagers separated by a predetermined distance, such as three to four images. This "stereo" imager works in the same way the human eyes do in that it captures images from two different angles and reconciles the two to determine distance.

In another embodiment, the depth imager 320 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 320 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth imager 320 adds a third "z-dimension" to the x-dimension and y-dimension defining the two-dimensional image captured by the imager 319, thereby enhancing the accuracy of detecting persons being present within the environment 104.

In one or more embodiments, the imager processor system 318 can be operable as a face analyzer and an environmental analyzer. The imager processor system 318 can be configured to process an image or depth scan of an object and determine whether the object matches predetermined criteria by comparing the image or depth scan to one or more predefined authentication references stored in memory 307. Advantageously, the imager processor system 318 can be used as a facial recognition device.

The other sensors 315 can also optionally include a light sensor that detects changes in optical intensity, color, light, or shadow in the environment of the electronic device 101. This can be used to make inferences about context such as weather or colors, walls, fields, and so forth, or other cues. It can also be used to determine whether the electronic device 101 is in a purse, pocket, or under a sleeve. An infrared sensor can be used in conjunction with, or in place of, the light sensor. The infrared sensor can be configured to detect thermal emissions from an environment about the electronic device 101. Similarly, a temperature sensor can be configured to monitor temperature about an electronic device.

The other sensors 315 can also include the sensors mentioned above with reference to FIG. 2. For example, the other sensors 315 can include a galvanometric sensor, a tension sensor, a touch sensor, or other sensors.

In one or more embodiments, the one or more processors 306 can define one or more process engines. One example of such a process engine is a context engine. The process engines can be a component of the one or more processors 306, operable with the one or more processors 306, defined by the one or more processors 306, and/or integrated into the one or more processors 306. Other configurations for the process engines, including as software or firmware modules operable on the one or more processors 306, will be obvious to those of ordinary skill in the art having the benefit of this disclosure.

The context engine can be operable with the various sensors to detect, infer, capture, and otherwise determine persons and actions that are occurring in the environment about the electronic device 101. For example, where included one embodiment of the context engine determines assessed contexts and frameworks using adjustable algorithms of context assessment employing information, data, and events. The context engine can comprise an artificial neural network, an artificial intelligence engine, or other similar technology in one or more embodiments. In one or more embodiments the context engine detects information gleaned from detecting multi-modal social cues, emotional states, moods, and other contextual information. The context engine can receive data from the various sensors.

Figure 4:
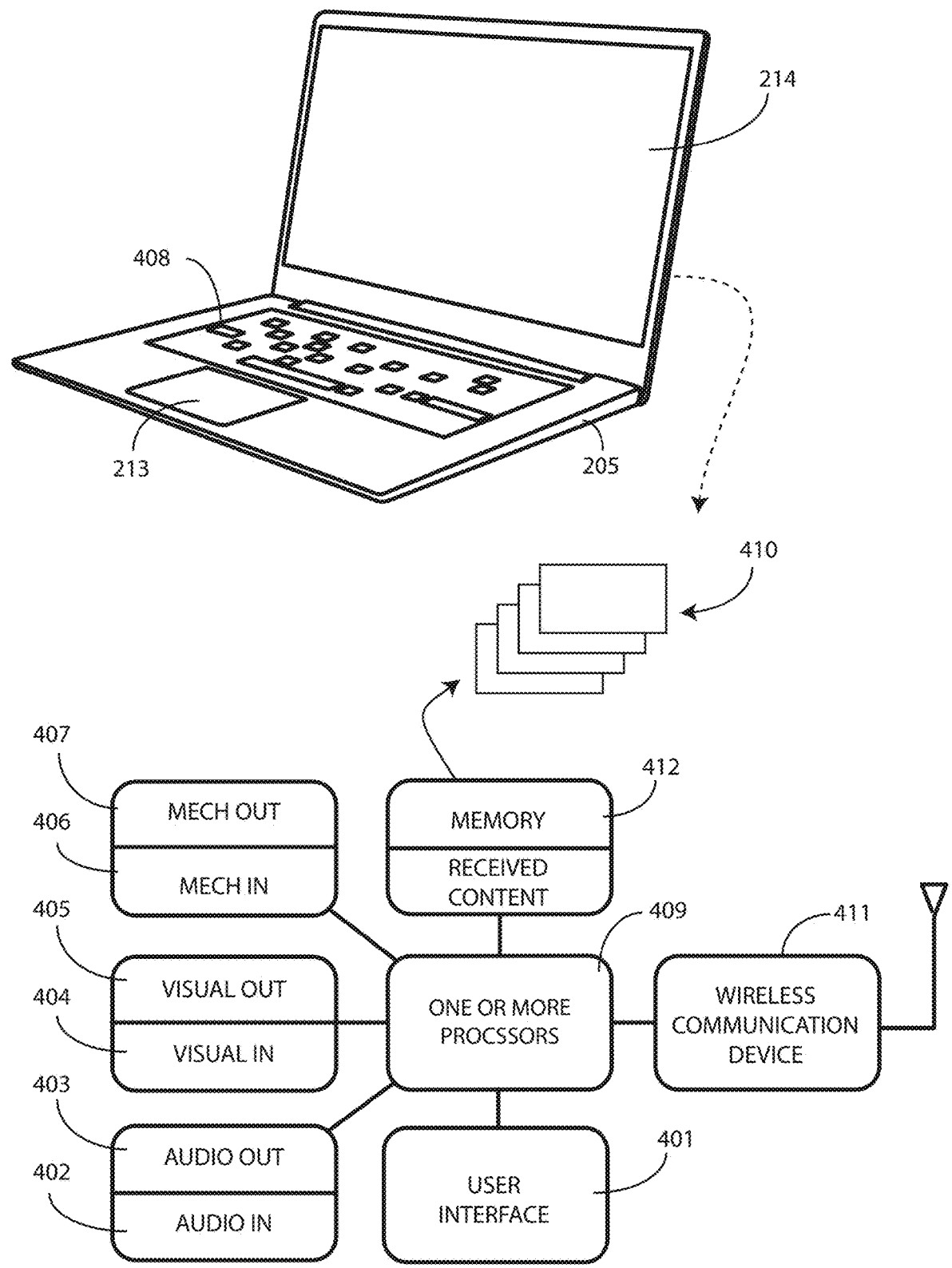
FIG. 4 illustrates one explanatory external, or companion, electronic device in accordance with one or more embodiments of the disclosure.

Turning now to FIG. 4, illustrated therein is one explanatory external electronic device 205 having a user interface 401 that is usable by the electronic device (101) of FIG. 3. The illustrative external electronic device 205 of FIG. 4 is configured as a laptop computer. While a laptop computer is one configuration for the external electronic device 205, the external electronic device 205 could be configured in other ways as well. As illustrated above in FIG. 1, the external electronic device 205 could also be a desktop computer or voice assistant. The external electronic device 205 could also be a tablet computer. Other types of external electronic devices suitable for embodiments of the disclosure will be obvious to those of ordinary skill in the art having the benefit of this disclosure.

In one or more embodiments, the electronic device 101 comprises a user interface 401. In one or more embodiments, the physical user interface 401 comprises components to receive visual input and deliver visual output, components to receive audio input and deliver audio output, and components to receive mechanical input and optionally deliver mechanical output.

Illustrating by example, in one or more embodiments the user interface 401 includes one or more audio input components 402, such as one or more microphones or other transducers that receive acoustic energy. In one or more embodiments, the user interface 401 includes one or more audio output components 403, such as one or more loudspeakers.

In one or more embodiments, the user interface 401 includes one or more visual input components 404, such as one or more imagers or depth imagers. In one or more embodiments, the user interface 401 comprises one or more visual output components, such as a display 214, lights, or other visible outputs.

In one or more embodiments, the user interface 401 comprises one or more mechanical input components 406, such as one a keyboard 408, a touch sensitive surface 213, or the display 214, when touch sensitive. In one or more embodiments, the user interface 401 optionally comprises one or more mechanical output components 407, such as one or more haptic devices, buzzers, shock pads, electrodes, or heating elements.

In one or more embodiments, the external electronic device 205 comprises one or more processors 409. In one embodiment, the one or more processors 409 can be a microprocessor, a group of processing components, one or more ASICs, programmable logic, or other type of processing device. A storage device, such as memory 412, can optionally store the executable software code 410 used by the one or more processors 409 during operation.

A communication device 411 can be configured for wired or wireless communication with one or more other devices or networks. The networks can include a wide area network, a local area network, and/or personal area network. The communication device 411 may also utilize wireless technology for communication, such as, but are not limited to, peer-to-peer or ad hoc communications such as HomeRF, Bluetooth.sup.™ and IEEE 802.11 (a, b, g or n), and other forms of wireless communication such as infrared technology. The communication device 411 can include wireless communication circuitry, one of a receiver, a transmitter, or transceiver, and one or more antennas.

Figure 5:
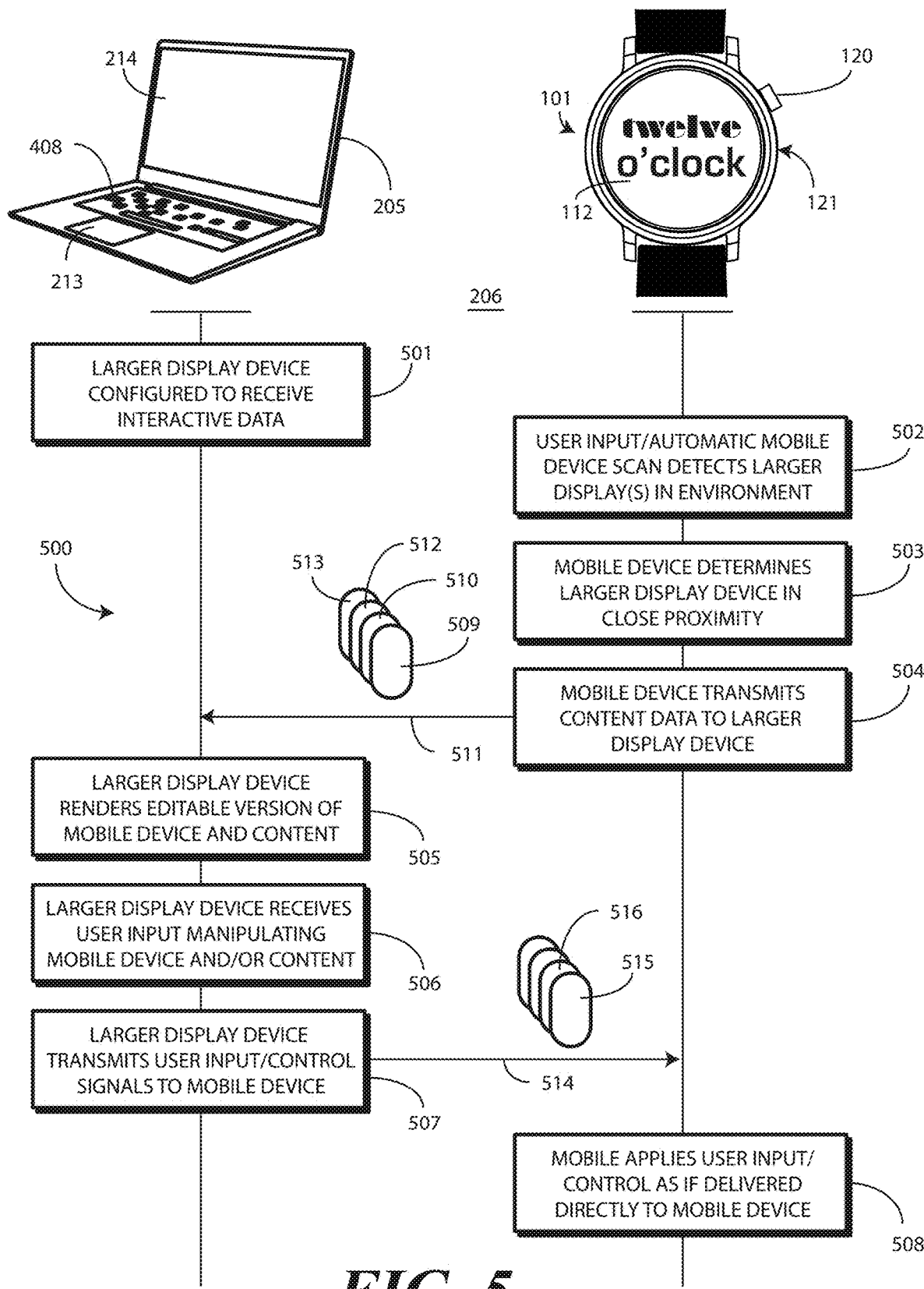
FIG. 5 illustrates one explanatory method in accordance with one or more embodiments of the disclosure.

Now that various hardware components have been described, attention will be turned to methods for using these and other hardware components in accordance with one or more embodiments of the disclosure. Turning now to FIG. 5, illustrated therein is one explanatory method 500 for an electronic device 101 and at least one external electronic device 205 in accordance with one or more embodiments of the disclosure. In this illustrative embodiment, the external electronic device 205 has a greater display output capability than does the electronic device 101.

Beginning at step 501, the external electronic device 205 is preloaded with software configuring it to enable the electronic device 101 to use one or more of its audio input components (402), its audio output components (403), its visual input components (404), its video outputs (405), one example of which is the display 214, its mechanical input components (406), examples of which include the keyboard 408 or touch-sensitive surface 213, and/or its mechanical outputs.

At step 502, the electronic device 101 discovers other electronic devices operating within an environment 206 of the electronic device 101. In one or more embodiments, step 502 comprises scanning, with a wireless communication device (308) of the electronic device 101, the environment of the electronic device 101 for one or more external electronic devices, e.g., external electronic device 205. In one or more embodiments, step 502 comprises scanning for one or more external electronic devices having one or both of a greater display output capability or a greater audio output capability than the electronic device 101.

Step 502 can occur in response to a user command, or alternatively it can occur automatically. For example, in one or more embodiments, such as when a person walks into a room with the electronic device 101 and the external electronic device 205 is operating in that room, step 502 can comprise the electronic device 101 automatically scanning to discover the external electronic device 205.

In another embodiment, a user interface of the electronic device 101 may receive a user input command requesting that the electronic device present content on at least one external electronic device. For example, the user may say, "Hey, watch, throw that on a local display for me." In one or more embodiments, step 502 then comprises scanning for one or more external electronic devices in response to, or as a result of, the user input command.

At optional step 503, where more than one external electronic device is discovered within the environment 206, the method 500 optionally includes determining which external electronic device is closest to a person, or is most easily viewed and/or heard by the person. For example, if there are three external electronic devices within an environment, and one is closer to the user, as determined by image analysis, gaze cone analysis, RSSI signals, location broadcasting, or other techniques, in one or more embodiments step 503 comprises selecting the external electronic device 205 closest to the person, or within the person's field of view, as the principal device with which to communicate. Accordingly, any content or graphical user interfaces delivered to this external electronic device 205 will be easy for the person to see.

At step 504, one or more processors (306) of the electronic device 101 cause the wireless communication device (308) to transmit 511 content 509 and one or more control commands 510 to the external electronic device 205. In one or more embodiments, the one or more control commands 510 cause the external electronic device 205 to output the content 509 to the environment 206.

In one or more embodiments, when the external electronic device 205 has a greater audio output capability than the electronic device 101, the content 509 comprises audio content. When the external electronic device 205 has a greater display output capability than the electronic device 101, the content 509 comprises visual content. Where the external electronic device 205 has both a greater audio output capability and a greater display output capability than the electronic device 101, the content 509 can comprise both audio content and visual content.

In one or more embodiments, the content 509 comprises a graphical user interface 512. In one or more embodiments, the graphical user interface 512 comprises a depiction 513 of a physical user interface 121 of the electronic device 101. In one or more embodiments, the graphical user interface 512 depicts the physical user interface 121 of the electronic device 101 presenting other content to the environment 206.

At step 505, the external electronic device 205 outputs the content 509 and/or graphical user interface 512 to the environment 206. In one or more embodiments, step 505 comprises outputting an "editable" wearable content window on the display 214 of the external electronic device 205.

At step 506, the external electronic device 205 receives user inputs interacting with one or both of the content 509 and/or the graphical user interface 512. At step 507, the external electronic device 205 transmits 512 one or more other control commands 515 to the electronic device 101, which are received by the same. In one or more embodiments, the one or more other control commands 515 identify the user inputs 516 interacting with the graphical user interface 512, the content 509, or combinations thereof, at the external electronic device.

At step 508, one or more processors (306) of the electronic device 101 perform a control operation in response to receiving the one or more other control commands 515. For example, if the content 509 was a photograph presented on the display 214 of the external electronic device 205, and the user inputs 516 were a pinch gesture on the touch-sensitive surface 203 zooming the photograph out, the one or more processors (306) of the electronic device 101 would cause the photograph being presented on the display 112 of the electronic device 101 to zoom out as well. If the user inputs 516 were interactions with the depiction 513 of the physical user interface 121 of the electronic device 101, such as someone pressing a virtual button corresponding to a physical button 120, the one or more processors (306) may perform a control operation that is the same as if the physical button 120 were pressed at the physical user interface 121, and so forth.

Advantageously, the method 500 of FIG. 5 solves problems arising from situations such as when the electronic device 101 is in a pocket and unavailable for user interaction via touch or voice. Illustrating by example, if a person is on a train, and working on the external electronic device 205, with the electronic device 101 stowed in a pocket, the method 500 of FIG. 5 advantageously allows content 509 and a graphical user interface 512 depicting a physical user interface 121 of the electronic device 101 to be presented on the display 214 of the external electronic device 205. In such a situation, new messages received by the electronic device 101 are displayed seamlessly on the display 214 of the external electronic device 205 due to proximity between the electronic device 101 and the external electronic device 205.

Moreover, in one or more embodiments the method 500 of FIG. 5 presents an editable, scalable wearable content window on the display 214 of the external electronic device 205 that can be manipulated by delivering user input to the user interface of the external electronic device 205. In one or more embodiments, this editable content window is not simply a mirrored output of the display 112 of the electronic device 101, but a live interface for viewing, manipulating, adding, and sharing. In such an embodiment, the person not only can read messages over voice for privacy but also can manipulate and send back from the external electronic device 205 to the electronic device 101 as if person is interfacing directly with the electronic device 101 over voice.

Accordingly, in one or more embodiments when the person detects that the electronic device 101 is not accessible, such as when it is in a pocket via pocket detection, the method 500 of FIG. 5 allows messages received by the electronic device 101 to appear live, i.e., in the form of an editable copy, to appear on the external electronic device 205. This allows a person to enlarge, respond, comment, and/or reply to the message received by the electronic device 101 using the external electronic device 205. Other advantages offered by the method 500 of FIG. 5 will be obvious to those of ordinary skill in the art having the benefit of this disclosure.

Figure 6:
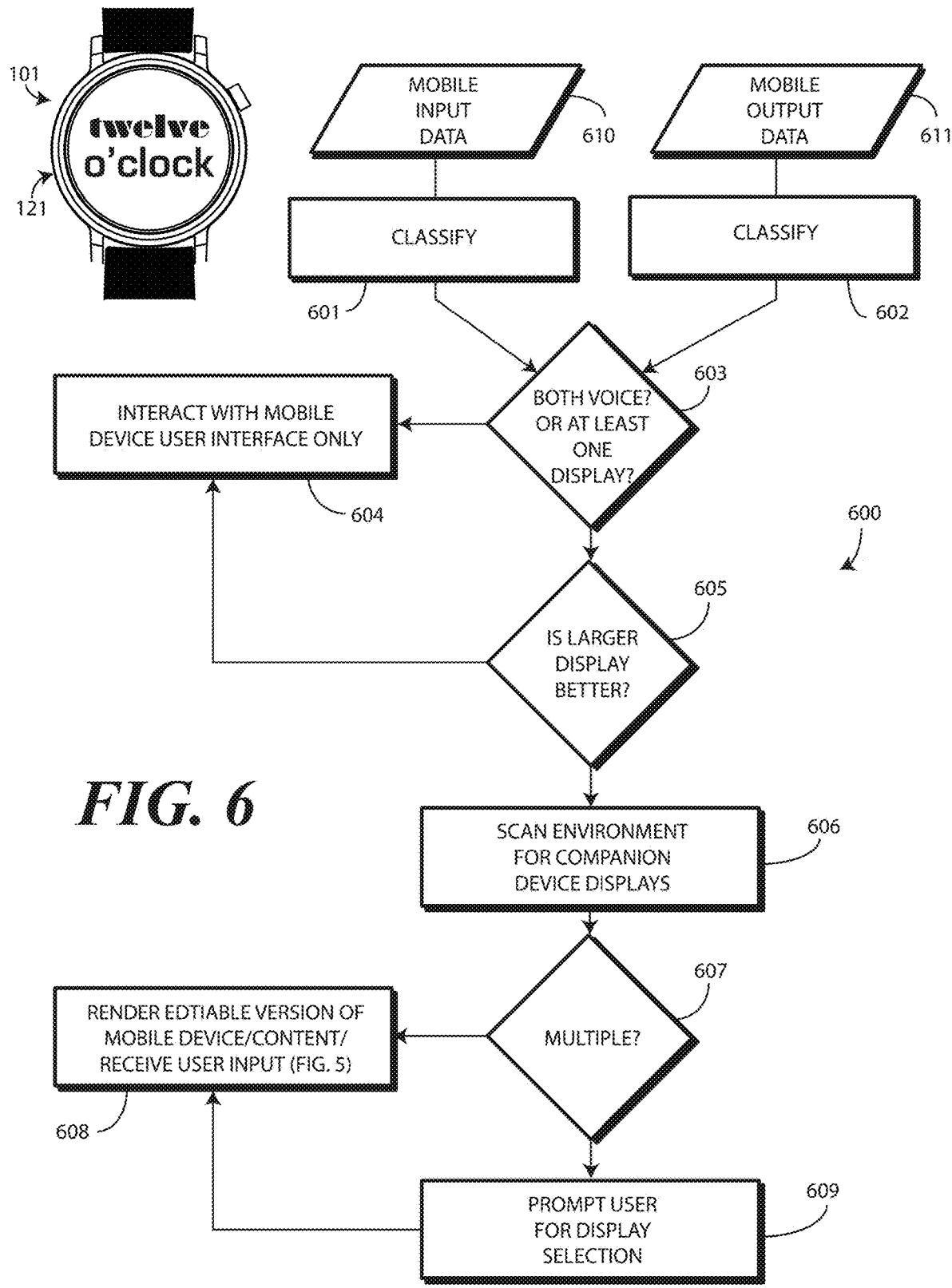
FIG. 6 illustrates another explanatory method in accordance with one or more embodiments of the disclosure.

Turning now to FIG. 6, illustrated therein is another explanatory method 600 in accordance with one or more embodiments of the disclosure. Beginning at step 601, one or more processors (306) of an electronic device 101 classify input data 610 as either audio only, e.g., voice input, or interactive input, which may include voice input and other input such as touch input, keyboard strokes, and so forth. At step 602, the one or more processors (306) of the electronic device 101 classify output data as either audio only output data, or alternatively as audio and visual output data.

Depending upon what classification is applied to the output data, and what classification of input data is expected, as determined at decision 603, the one or more processors (306) of the electronic device 101 then decide at decision 605 whether a user interface of a companion external electronic device would improve the user interface experience. If not, output data is presented, and input data is received, at the physical user interface 121 of the electronic device at step 604.

However, if a user interface of a companion external electronic device would improve the user interface experience, at step 606 the one or more processors (306) of the electronic device 101 identify one or more companion external electronic devices operating within an environment of the electronic device 101 as previously described.

At decision 607, the one or more processors (306) of the electronic device 101 determine whether none, one, or multiple external electronic devices are operating within the environment of the electronic device 101. Where there are multiple external electronic devices operating within the environment of the electronic device, i.e., where the wireless communication device (308) of the electronic device identifies a plurality of external electronic devices operating in the environment, at step 609 the one or more processors (306) of the electronic device 101 prompt for a selection of which external electronic device of the plurality of external electronic devices to use.

This prompting occurring at step 609 can occur in various ways. In one or more embodiments, the one or more processors (306) of the electronic device 101 cause an audio prompt to be delivered from the physical user interface 121 of the electronic device 101 asking which external electronic device to use. A loudspeaker of the physical user interface 121 may ask, "Which display do you want, the smartphone or the laptop," for example.

In another embodiment, the one or more processors (306) of the electronic device 101 cause one or more user interfaces of the external electronic devices to cause an audio prompt to be delivered. For example, if a smartphone and a laptop are operating in the environment, the one or more processors (306) of the electronic device 101 may cause the one closest to the person, or alternatively with the loudest speaker, to say, "Which display do you want, the smartphone or the laptop?" Alternatively, the one or more processors (306) of the electronic device 101 may cause all external electronic devices to deliver such a prompt, optionally in harmony like a chorus. In still another embodiment, the one or more processors (306) of the electronic device 101 may cause one of the external electronic devices to present a message on the display, stating, "Tell the electronic device which display to use, please."

In yet another embodiment, the one or more processors (306) of the electronic device 101 may transmit, with the wireless communication device (308), one or more other control commands causing each external electronic device of the plurality of external electronic devices to deliver a unique device identifier to the environment. For instance, in one or more embodiments all displays of the plurality of external electronic devices may present a unique name or number to identify themselves. The one or more processors (306) of the electronic device 101 may then prompt the user asking, "Which number do you want," or something similar. Step 609 can then comprise the one or more processors (306) of the electronic device 101 receiving user input, optionally in the form of a voice command, identifying the name or number of the desired external electronic device.

At step 608, the one or more processors (306) of the electronic device 101 cause the wireless communication device (308) to transmit content and one or more control commands to the selected external electronic device. In one or more embodiments, the one or more control commands cause the selected external electronic device to output the content to the environment. At step 608, the selected external electronic device outputs the content and/or graphical user interface to the environment. In one or more embodiments, step 608 comprises outputting an "editable" wearable content window on the display of the selected external electronic device.

Figure 7:
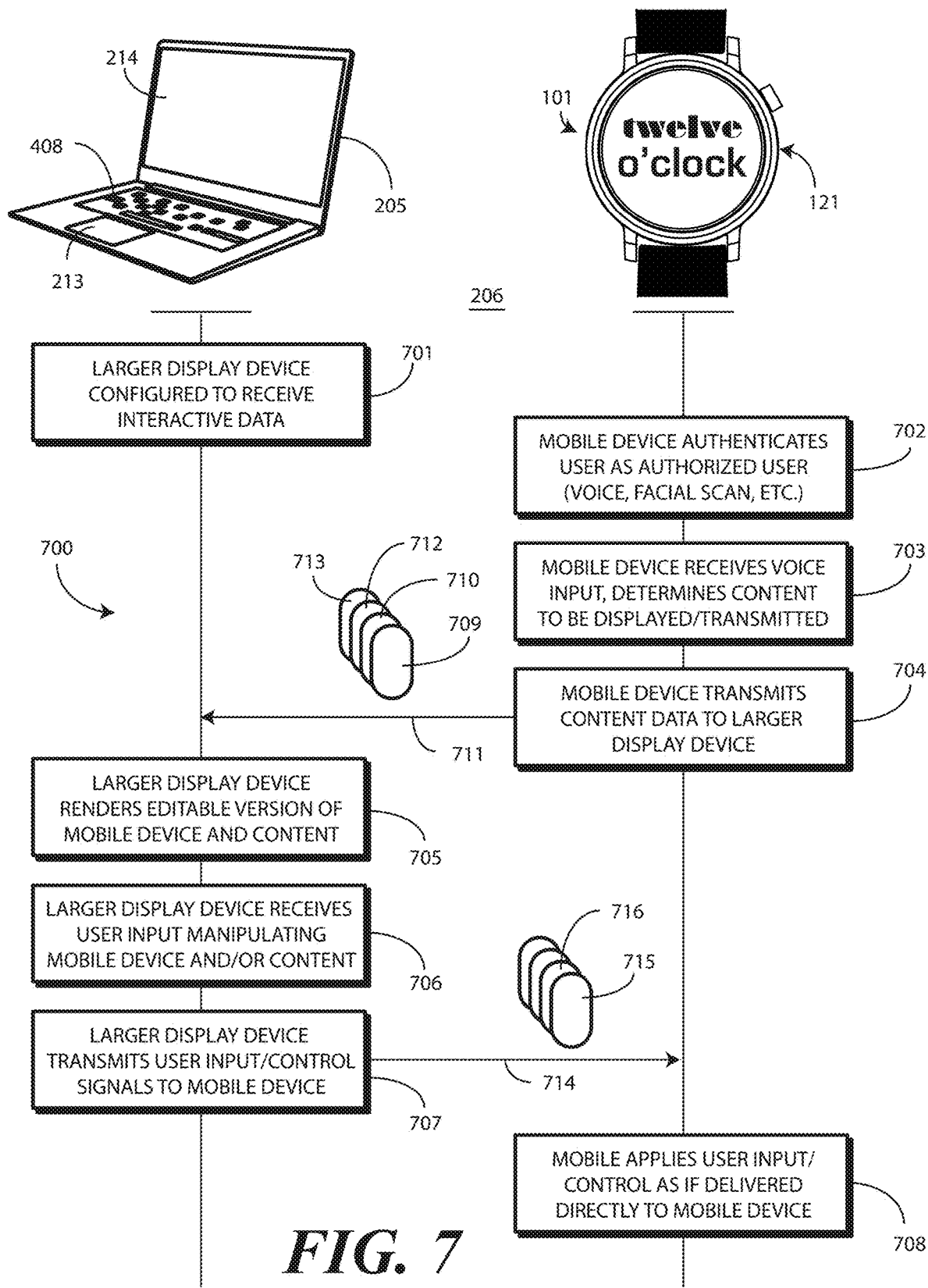
FIG. 7 illustrates another explanatory method in accordance with one or more embodiments of the disclosure.

Turning now to FIG. 7, illustrated therein is yet another method 700 in which the electronic device 101 includes voice authentication/assistant capabilities and is operable with at least one external electronic device 205 in accordance with one or more embodiments of the disclosure. Beginning at step 701, the external electronic device 205 is preloaded with software configuring it to enable the electronic device 101 to use one or more of its audio input components (402), its audio output components (403), its visual input components (404), its video outputs (405), one example of which is the display 214, its mechanical input components (406), examples of which include the keyboard 408 or touch-sensitive surface 213, and/or its mechanical outputs.

At step 702, one or more processors (306) of the electronic device 101 authenticate a person as an authorized user of the electronic device 101. In one or more embodiments, the one or more processors (306) of the electronic device 101 use voice recognition to authenticate the person as the authorized user of the electronic device 101. In other embodiments, the one or more processors (306) of the electronic device 101 use facial recognition to authenticate the person as the authorized user of the electronic device 101. Other techniques for authenticating the person as the authorized user of the electronic device 101 will be obvious to those of ordinary skill in the art having the benefit of this disclosure.

At step 703, the one or more processors (306) of the electronic device 101 receive one or more voice commands identifying which content should be presented on the external electronic device 205. In one or more embodiments, step 703 also includes the one or more processors (306) of the electronic device 101 receiving voice commands identifying which external electronic device 205 should be used for content presentation. Illustrating by example, the authorized user may say, "Hey, watch, throw that on the laptop for me." Other voice commands will be obvious to those of ordinary skill in the art having the benefit of this disclosure.

In response to the voice commands, step 703 can optionally include the one or more processors (306) of the electronic device 101 discovering other electronic devices operating within an environment 206 of the electronic device 101. For instance, step 703 can comprise scanning the environment 206 for one or more external electronic devices, establishing communication connections with the devices, and so forth.

At step 704, one or more processors (306) of the electronic device 101 cause the wireless communication device (308) to transmit 711 content 709 and one or more control commands 710 to the external electronic device 205. In one or more embodiments, the one or more control commands 710 cause the external electronic device 205 to output the content 709 to the environment 206.

In one or more embodiments, the content 709 comprises a graphical user interface 712. In one or more embodiments, the graphical user interface 712 comprises a depiction 713 of a physical user interface 121 of the electronic device 101. In one or more embodiments, the graphical user interface 712 depicts the physical user interface 121 of the electronic device 101 presenting other content to the environment 206.

At step 705, the external electronic device 205 outputs the content 709 and/or graphical user interface 712 to the environment 206. In one or more embodiments, step 705 comprises outputting an "editable" wearable content window on the display 214 of the external electronic device 205.

At step 706, the external electronic device 205 receives user inputs interacting with one or both of the content 709 and/or the graphical user interface 712. At step 707, the external electronic device 205 transmits 712 one or more other control commands 715 to the electronic device 101, which are received by the same. In one or more embodiments, the one or more other control commands 715 identify the user inputs 716 interacting with the graphical user interface 712, the content 709, or combinations thereof, at the external electronic device.

At step 708, one or more processors (306) of the electronic device 101 perform a control operation in response to receiving the one or more other control commands 715. For example, if the content 709 was a photograph presented on the display 214 of the external electronic device 205, and the user inputs 716 were a pinch gesture on the touch-sensitive surface 203 zooming the photograph out, the one or more processors (306) of the electronic device 101 would cause the photograph being presented on the display 112 of the electronic device 101 to zoom out as well. If the user inputs 716 were interactions with the depiction 713 of the physical user interface 121 of the electronic device 101, such as someone pressing a virtual button corresponding to a physical button 120, the one or more processors (306) of the electronic device 101 may perform a control operation that is the same as if the physical button 120 were pressed at the physical user interface 121, and so forth.

Figure 8:
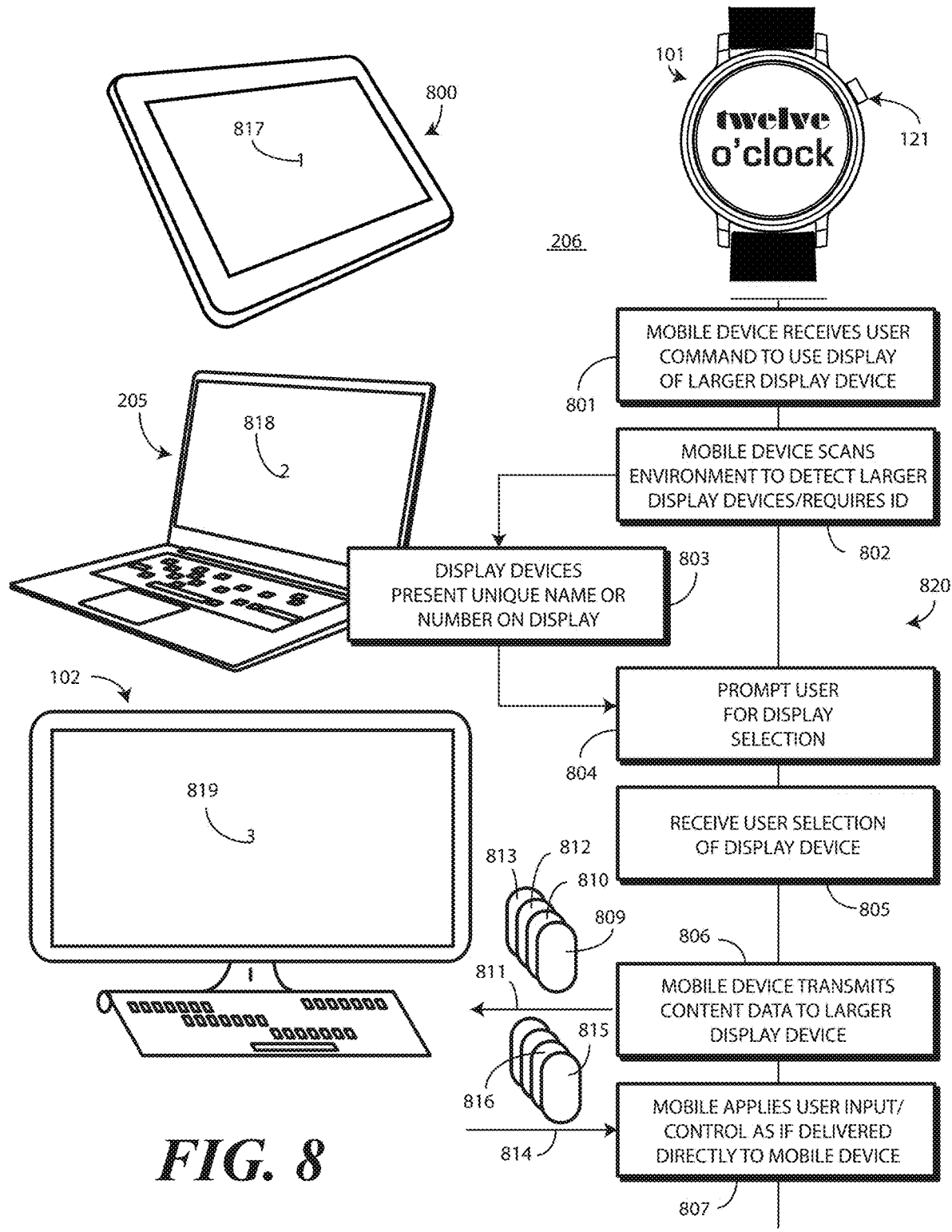
FIG. 8 illustrates still another explanatory method in accordance with one or more embodiments of the disclosure.

Turning now to FIG. 8, illustrated therein is yet another method 820 for an electronic device 101 and one or more external electronic devices 102,205,800 in accordance with one or more embodiments of the disclosure. Beginning at step 801, one or more processors (306) of the electronic device 101 receive a user command requesting that an external electronic device having one or both of a greater display output capability or a greater audio output capability be used to display content 809. For example, a user might say, "Hey, watch, throw that on a local display," or something similar.

At step 802, the one or more processors (306) of the electronic device 101 discover other electronic devices 102,205,800 operating within an environment 206 of the electronic device 101. For instance, step 802 can comprise scanning the environment 206 for one or more external electronic devices 102,205,800, establishing communication connections with the devices, and so forth.

In the illustrative embodiment of FIG. 8, there are three external electronic devices 102,205,800 operating in the environment. In this embodiment, to determine which external electronic device 102,205,800 step 802 comprises the one or more processors (306) of the electronic device 101 causing the wireless communication device (308) to transmit one or more other control commands causing each external electronic device 102,205,800 of the plurality of external electronic devices to deliver a unique device identifier 817,818,819 to the environment 206. In this example, the unique device identifier 817,818,819 is a unique number. Thus, external electronic device 800 displays the number "1," while external electronic device 205 displays the number "2" and external electronic device 102 displays the number "3."

In other embodiments, names could be used as the unique device identifier 817,818,819 rather than a number. Other examples for use as the unique device identifier 817,818,819 will be obvious to those of ordinary skill in the art having the benefit of this disclosure. It should be noted that the unique device identifier 817,818,819 could be delivered to the environment 206 in other ways as well. For example, the unique device identifier 817,818,819 could be audibly announced rather than presented on a display, and so forth.

At step 804, the one or more processors (306) of the electronic device 101 prompt for a selection of which external electronic device to select from the plurality of external electronic devices 102,205,800. In one embodiment, the loudspeaker of the electronic device 101 might state, "which number, please?" Other examples of prompts suitable for use at step 804 will be obvious to those of ordinary skill in the art having the benefit of this disclosure. At step 805, the one or more processors (306) of the electronic device 101 receive a user input command selecting the desired external electronic device, and optionally requesting the presentation of the content 809 on the selected external electronic device. For instance, step 805 can comprise the one or more processors (306) of the electronic device 101 receiving the command, "Throw it on number one, please."

At step 806, one or more processors (306) of the electronic device 101 cause the wireless communication device (308) to transmit 811 content 809 and one or more control commands 810 to the selected external electronic device. In one or more embodiments, the one or more control commands 810 cause the selected external electronic device to output the content 809 to the environment 206.

In one or more embodiments, the content 809 comprises a graphical user interface 812. In one or more embodiments, the graphical user interface 812 comprises a depiction 813 of a physical user interface 121 of the electronic device 101. In one or more embodiments, the graphical user interface 812 depicts the physical user interface 121 of the electronic device 101 presenting other content to the environment 206.

At step 807, the electronic device receives 814 one or more other control commands 815. In one or more embodiments, the one or more other control commands 815 identify the user inputs 816 interacting with the graphical user interface 812, the content 809, or combinations thereof, at the selected external electronic device. At step 807, one or more processors (306) of the electronic device 101 perform a control operation in response to receiving the one or more other control commands 815.

Figure 9:
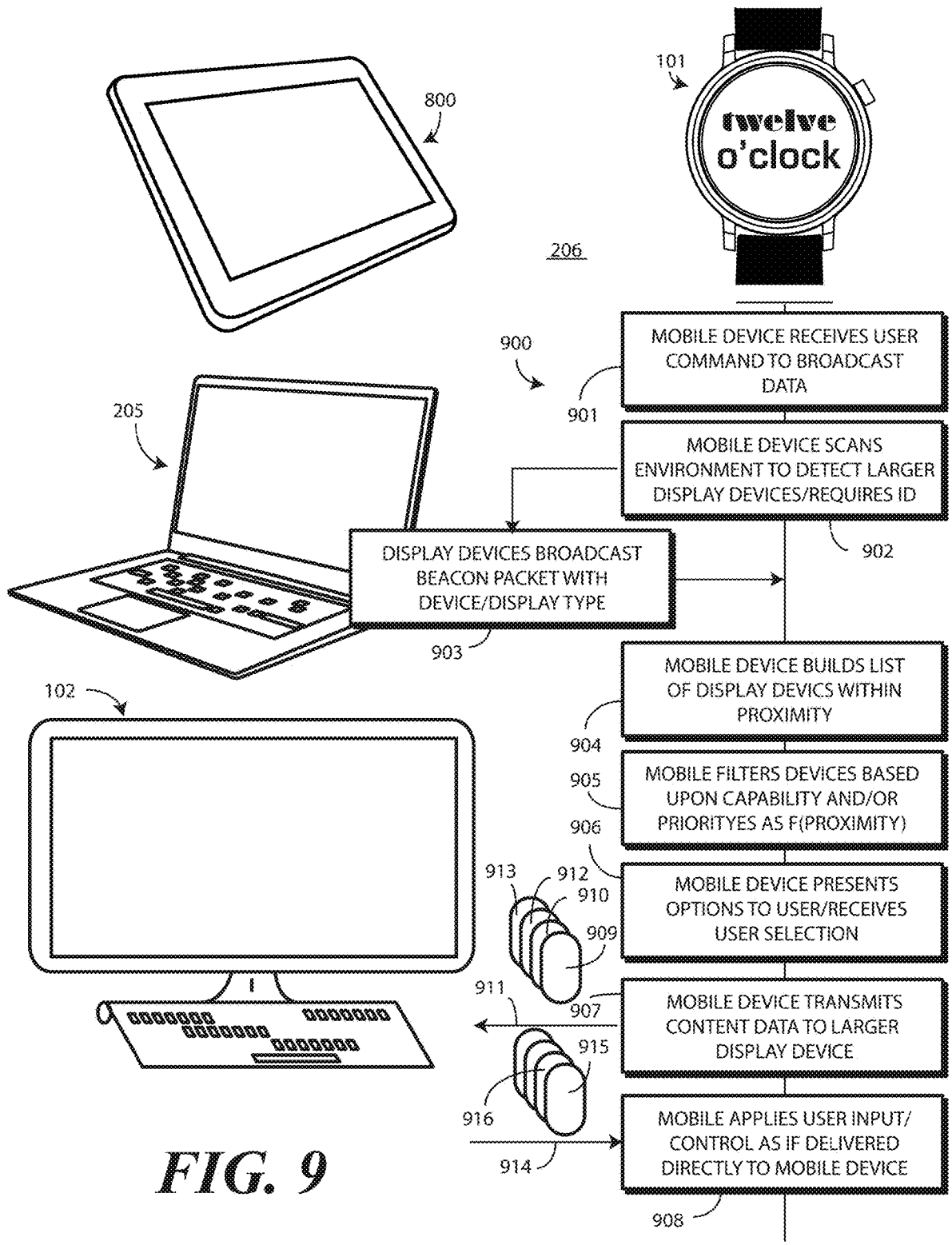
FIG. 9 illustrates yet another explanatory method in accordance with one or more embodiments of the disclosure.

Turning now to FIG. 9, illustrated therein is yet another method 900 for an electronic device 101 and one or more external electronic devices 102,205,800 in accordance with one or more embodiments of the disclosure. Beginning at step 901, one or more processors (306) of the electronic device 101 receive a user command requesting that an external electronic device having one or both of a greater display output capability or a greater audio output capability be used to display content 909. For example, a user might say, "Hey, watch, throw that on a local display," or something similar.

At step 902, the one or more processors (306) of the electronic device 101 discover other electronic devices 102,205,800 operating within an environment 206 of the electronic device 101. For instance, step 902 can comprise scanning the environment 206 for one or more external electronic devices 102,205,800, establishing communication connections with the devices, and so forth.

In the illustrative embodiment of FIG. 8, there are three external electronic devices 102,205,800 operating in the environment. At step 903, each external electronic device 102,205,800 broadcasts a beacon packet with their device type and user interface capabilities. These user interface capabilities can include display type, display size, audio input capabilities, audio output capabilities, peripheral devices attached, such as keyboards, mouse devices, and so forth.

At step 904 the one or more processors (306) of the electronic device 101 build a list of screens and audio transducers/speakers within proximity of the electronic device 101. At step 905, the one or more processors (306) of the electronic device 101 filter the plurality of external electronic devices 102,205,800 as a function of external device capability to obtain a subset of external electronic devices, e.g., external electronic devices 102,205. At step 906, the one or more processors (306) of the electronic device 101 prompt for the selection of the at least one external electronic device from the subset of external electronic devices, and receives a corresponding selection.

At step 907, one or more processors (306) of the electronic device 101 cause the wireless communication device (308) to transmit 911 content 909 and one or more control commands 910 to the selected external electronic device. In one or more embodiments, the one or more control commands 910 cause the selected external electronic device to output the content 909 to the environment 206.

In one or more embodiments, the content 909 comprises a graphical user interface 912. In one or more embodiments, the graphical user interface 912 comprises a depiction 913 of a physical user interface 121 of the electronic device 101. In one or more embodiments, the graphical user interface 912 depicts the physical user interface 121 of the electronic device 101 presenting other content to the environment 206.

At step 908, the electronic device receives 914 one or more other control commands 915. In one or more embodiments, the one or more other control commands 915 identify the user inputs 916 interacting with the graphical user interface 912, the content 909, or combinations thereof, at the selected external electronic device. At step 908 one or more processors (306) of the electronic device 101 perform a control operation in response to receiving the one or more other control commands 915.

Figure 10:
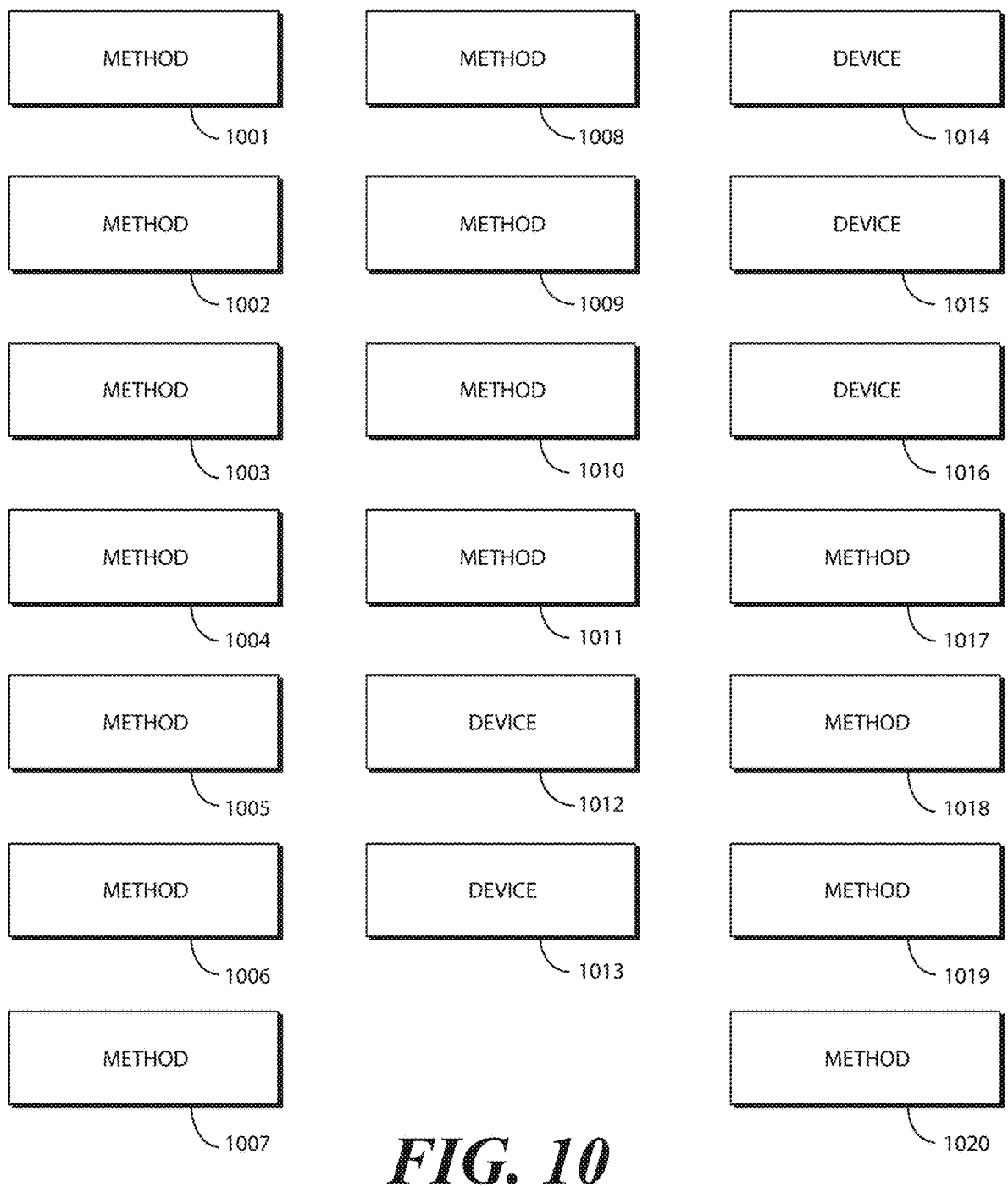
FIG. 10 illustrates various embodiments of the disclosure.

Turning now to FIG. 10, illustrated therein are various embodiments of the disclosure. At 1001, a method in an electronic device comprises detecting, with a wireless communication device of the electronic device, at least one external electronic device operating within an environment of the electronic device. At 1001, the method comprises causing, by one or more processors of the electronic device, the wireless communication device to transmit content and one or more control commands from the electronic device to the at least one external electronic device.

At 1001, the electronic device may do this for a variety of reasons. For example, the electronic device may be inaccessible due to the fact that it is in a pocket or other repository container. Alternatively, a sleeve or other object may be covering the electronic device. In another embodiment, the electronic device may just be farther from a person than is the at least one external electronic device. In still another embodiment, the electronic device may be less capable for a specific task than is the external electronic device. In still another embodiment, the electronic device may be operating under suboptimal conditions, such as in a loud environment, rubbing/microphone induced noise, and may prefer to have the external electronic device output content. In still another embodiment, the electronic device may detect a user gazing in the direction of the external electronic device. In another embodiment, each of these factors is assessed, in combination with sensory data pertaining to devices relevant locations, beacons, user detection, device mode of operation, contextual detections, to determine whether to use the user interface of the external electronic device for the presentation of content and receipt of user interactions. Still other reasons to do so will be obvious to those of ordinary skill in the art having the benefit of this disclosure.

At 1001, the one or more control commands cause the at least one external electronic device to output the content to the environment. At 1001, the method comprises receiving, with the wireless communication device, one or more other control commands identifying one or more user inputs occurring at a user interface of the at least one external electronic device in response to presentation of the content to the environment. At 1001, the method comprises performing, with the one or more processors at the electronic device, one or more control operations on the content as a function of the one or more user inputs.

At 1002, the at least one external electronic device has one or more of a greater display output capability than the electronic device or a greater audio output capability than the electronic device. At 1003, the at least one external electronic device of 1002 has the greater audio output capability than the electronic device. At 1003, the content comprises audio content. At 1003, the one or more user inputs comprise voice commands.

At 1004, the at least one external electronic device of 1002 has the greater display output capability than the electronic device. At 1004, the content comprises a graphical user interface depicting a physical user interface of the electronic device. At 1005, the graphical user interface of 1004 further depicts the physical user interface of the electronic device presenting other content to the environment. At 1006, the one or more user inputs of 1004 comprise one or more user interactions with a depiction of the physical user interface of the electronic device.

At 1007, the method of 1004 further comprises scanning, with the wireless communication device of the electronic device, and prior to the detecting, the environment of the electronic device for one or more external electronic devices having the greater display output capability than the electronic device or the greater audio output capability than the electronic device. At 1008, the method of 1007 further comprises receiving, with a user interface of the electronic device, a user input command requesting the presentation of the content on the at least one external electronic device. At 1008, the scanning occurs as a result of the user input command.

At 1009 the detecting of 1007 comprises detecting a plurality of external electronic devices operating within the environment of the electronic device. At 1009, the method of 1007 further comprises prompting, by the one or more processors at a user interface of the electronic device, for a selection of the at least one external electronic device from the plurality of external electronic devices.

At 1010, the method of 1009 further comprises filtering, by the one or more processors, the plurality of external electronic devices as a function of external device capability to obtain a subset of external electronic devices. At 1010, the prompting comprises prompting for the selection of the at least one external electronic device from the subset of external electronic devices.

At 1011, the detecting of 1007 comprises detecting a plurality of external electronic devices operating within the environment of the electronic device. At 1011, the method further comprises transmitting, with the wireless communication device, one or more other control commands causing each external electronic device of the plurality of external electronic devices to deliver a unique device identifier to the environment.

At 1012, an electronic device comprises a physical user interface. At 1012, the electronic device comprises a wireless communication device and one or more processors operable with the user interface and the wireless communication device.

At 1012, the one or more processors cause the wireless communication device to identify one or more external electronic devices operating within an environment of the electronic device. At 1012, the one or more processors cause the wireless communication device to transmit content and one or more control commands causing an external electronic device of the one or more external electronic devices to present a graphical user interface depicting the physical user interface of the electronic device to the environment.

At 1012, the wireless communication device receives one or more other control commands identifying user inputs interacting with the graphical user interface at the external electronic device. At 1012, the one or more processors perform one or more control operations in response to the one or more other control commands.

At 1013, the user interface of 1012 receives a user input requesting presentation of the graphical user interface on the external electronic device. At 1014, the wireless communication device of 1013 identifies a plurality of external electronic devices operating within the environment. At 1014, the one or more processors prompt, at the physical user interface, for a selection of the external electronic device from the plurality of external electronic devices.

At 1015, the electronic device of 1014 comprises a wearable electronic device. At 1015, the graphical user interface comprises a depiction of the wearable electronic device. AT 1016, the physical user interface of 1012 is devoid of a display.

At 1017, a method in an electronic device comprises receiving, with a wireless communication device of the electronic device, content and one or more control commands from an external electronic device operating within an environment of the electronic device. At 1017, the method comprises presenting, at a user interface of the electronic device, the content to the environment in response to the one or more control commands.

At 1017, the method comprises receiving, with the user interface, one or more user inputs in response to presentation of the content to the environment. At 1017, the method comprises transmitting, with the wireless communication device, one or more other control commands identifying the one or more user inputs to the external electronic device.

At 1018, the content of 1017 comprises a graphical user interface depicting a physical user interface of the external electronic device. At 1019, the one or more user inputs of 1018 comprise one or more user interactions with a depiction of the physical user interface of the electronic device.

At 1020, the method of 1018 further comprises receiving, with the wireless communication device, one or more other control commands from the external electronic device requesting the user interface to display a unique identifier. At 1020, the method comprises presenting, with the user interface, the unique identifier in response to the one or more other control commands.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, one key advantage offered by embodiments of the disclosure is the fact that the methods and systems described herein provide for the detection of a person, the detection of available devices around the person, and the seamless automatic proximity triggered pairing between devices as a function of the state of the user interface, the state of devices, e.g., whether they are covered, far from the person, in a hand, suboptimum functionality (rubbing, noise, battery level), etc., relative locations, whether devices are paired, and so forth. Embodiments of the disclosure automatically present in one or more embodiments, and without manual intervention from a person, fully editable/two way device graphical user interfaces to external electronic devices with those graphical user interfaces optimized to match the sharing device and the local device capability for optimum user engagement. For instance, a simplified graphical user interface of a desktop computer can be presented on the display of a wearable electronic device, with that graphical user interface having only the key elements to control the desktop computer presented on the small small screen of the wearable electronic device in one or more embodiments.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A method in an electronic device, the method comprising:
    detecting, with one or more sensors of the electronic device, that a user interface of the electronic device is unavailable for user interaction and, in response to detecting that the user interface is unavailable for user interaction, initiating a detection, with a wireless communication device of the electronic device, of at least one external electronic device operating within an environment of the electronic device;
    causing, by one or more processors of the electronic device, the wireless communication device to transmit content and one or more control commands from the electronic device to the at least one external electronic device, the one or more control commands causing the at least one external electronic device to output the content to the environment;
    receiving, with the wireless communication device, one or more other control commands identifying one or more user inputs occurring at a user interface of the at least one external electronic device in response to presentation of the content to the environment; and
    performing, with the one or more processors at the electronic device, one or more control operations on the content as a function of the one or more user inputs.

2. The method of claim 1, the detecting that the user interface is unavailable for user interaction comprising detecting that the user interface is covered by clothing.

3. The method of claim 1, the detecting that the user interface is unavailable for user interaction comprising detecting that the electronic device is in a purse.

4. The method of claim 1, the detecting that the user interface is unavailable for user interaction comprising detecting that the electronic device is in a pocket.

5. The method of claim 1, the initiating the detecting of the at least one external electronic device occurring only when the user interface of the electronic device has been unavailable for user interaction for at least a predefined period of time.

6. The method of claim 1, the detecting that the user interface is unavailable for user interaction comprising detecting that the electronic device is rotationally stable one or more user inputs comprising one or more user interactions with a depiction of the user interface of the electronic device.

7. The method of claim 1, further comprising, confirming, with at least one additional sensor of the electronic device, that the user interface of the electronic device is covered prior to initiating the detecting of the at least one external electronic device.

8. The method of claim 7, further comprising audibly prompting for permission to transmit content to the at least one external electronic device and receiving, with a user interface of the electronic device, an audible user input command requesting the presentation of the content on the at least one external electronic device.

9. The method of claim 8, the audibly prompting comprising delivering an audible output in the form of a question.

10. The method of claim 9, the question consisting of "can I throw that on a local display for you."

11. The method of claim 10, the audible user input command and the question each having a verb in common.

12. An electronic device, comprising:
- a physical user interface;
- a wireless communication device; and
- one or more processors operable with the physical user interface and the wireless communication device;
- the one or more processors causing the wireless communication device to identify one or more external electronic devices operating within an environment of the electronic device when the physical user interface is unavailable for user interaction;
- the one or more processors prompting, in response to identifying one or more electronic devices operating within the environment of the electronic device, for permission to transmit content to an electronic device of the one or more electronic devices;
- the one or more processors causing, in response to receiving the permission, the wireless communication device to transmit content and one or more control commands causing an external electronic device of the one or more external electronic devices to present a graphical user interface depicting the physical user interface of the electronic device to the environment;
- the wireless communication device receiving one or more other control commands identifying user inputs interacting with the graphical user interface at the external electronic device; and
- the one or more processors performing one or more control operations in response to the one or more other control commands.

13. The electronic device of claim 12, the physical user interface receiving a user input requesting presentation of the graphical user interface on the external electronic device.

14. The electronic device of claim 13, the wireless communication device identifying a plurality of external electronic devices operating within the environment, the one or more processors prompt, at the physical user interface, for a selection of the external electronic device from the plurality of external electronic devices.

15. The electronic device of claim 14, the electronic device comprising a wearable electronic device, the graphical user interface comprising a depiction of the wearable electronic device.

16. The electronic device of claim 12, the one or more electronic devices comprising a plurality of electronic devices each visibly presenting a unique identifier to an environment of the electronic device, wherein the permission includes a selected unique identifier identifying the electronic device of the plurality of electronic devices.

17. A method in an electronic device, the method comprising:
- receiving, with a wireless communication device of the electronic device, one or more first control commands from a covered external electronic device operating within an environment of the electronic device, the one or more first control commands requesting a user interface of the electronic device to display a unique identifier, and presenting, with the user interface, the unique identifier in response to the one or more first control commands; and thereafter
- receiving, with the wireless communication device of the electronic device, content and one or more second control commands from the covered external electronic device;
- presenting, at a user interface of the electronic device, the content to the environment in response to the one or more second control commands;
- receiving, with the user interface, one or more user inputs in response to presentation of the content to the environment; and
- transmitting, with the wireless communication device, one or more third control commands identifying the one or more user inputs to the covered external electronic device.

18. The method of claim 17, the content comprising a graphical user interface depicting a physical user interface of the covered external electronic device.

19. The method of claim 18, the one or more user inputs comprising one or more user interactions with a depiction of the physical user interface of the electronic device.

20. The method of claim 18, the unique identifier being audibly announced to the environment of the electronic device.

* * * * *